United States Patent
Xu et al.

(10) Patent No.: US 7,424,999 B2
(45) Date of Patent: Sep. 16, 2008

(54) CO-CURRENT VAPOR-LIQUID CONTACTING APPARATUS

(75) Inventors: Zhanping Xu, Amherst, NY (US); Brian J. Nowak, Orchard Park, NY (US); Thomas C. Heldwein, Pendleton, NY (US); Joseph Agnello, Grand Island, NY (US); Andrew J. Criscione, Amherst, NY (US); Aaron J. Muck, Clarence, NY (US)

(73) Assignee: UOP LLC, Des Plaines, IL (US)

( * ) Notice: Subject to any disclaimer, the term of this patent is extended or adjusted under 35 U.S.C. 154(b) by 351 days.

(21) Appl. No.: 11/431,721

(22) Filed: May 10, 2006

(65) Prior Publication Data
US 2007/0137482 A1    Jun. 21, 2007

Related U.S. Application Data

(60) Provisional application No. 60/751,041, filed on Dec. 16, 2005.

(51) Int. Cl.
*B01F 3/04* (2006.01)

(52) U.S. Cl. ............ 261/97; 261/110; 95/198; 96/189; 96/355

(58) Field of Classification Search ........... 261/97, 261/110, 114.1, 114.5; 95/198; 96/188, 96/189, 190, 355, 358
See application file for complete search history.

(56) References Cited

U.S. PATENT DOCUMENTS

| | | | |
|---|---|---|---|
| 4,361,469 A | 11/1982 | Trutna | 203/99 |
| 4,750,975 A | 6/1988 | Parker et al. | 202/154 |
| 4,752,307 A | 6/1988 | Asmus et al. | |
| RE33,444 E | 11/1990 | Lerner | |
| 5,244,604 A | 9/1993 | Miller et al. | 261/97 |
| 5,318,732 A | 6/1994 | Monkelbaan et al. | 261/114.1 |
| 5,554,329 A | 9/1996 | Monkelbaan et al. | 261/98 |
| 5,683,629 A | 11/1997 | Konijn | 261/79.2 |
| 5,690,708 A | 11/1997 | Danckaarts et al. | |
| 5,707,563 A | 1/1998 | Monkelbaan et al. | 261/98 |
| 5,798,086 A | 8/1998 | Erickson | 422/211 |
| 5,837,105 A | 11/1998 | Stober et al. | 203/40 |
| 5,885,488 A | 3/1999 | Konijn | 261/79.2 |
| 6,059,934 A | 5/2000 | Stober et al. | 203/40 |
| 6,224,043 B1 | 5/2001 | Fan et al. | 261/114.1 |
| 6,682,633 B1 | 1/2004 | Xu et al. | 203/1 |
| 2002/0079597 A1* | 6/2002 | Bartlok | 261/97 |

* cited by examiner

*Primary Examiner*—Scott Bushey
(74) *Attorney, Agent, or Firm*—David J Plasecki

(57) ABSTRACT

The invention is a high capacity and high efficiency co-current vapor-liquid contacting apparatus for use in distillation columns and other vapor-liquid contacting processes. The apparatus is characterized by an arrangement of modules in horizontal stages rather than tray-like construction. The modules define a co-current contacting volume and in an exemplary configuration the modules include a liquid distributor, a demister, a receiving pan and a duct. The modules of one stage are rotated to be non-parallel with respect to the modules of an inferior stage, a superior stage, or both. Variations relate to the design of the individual elements such as the demister, liquid distributor, ducts, and contacting volumes, and the overall arrangement of the apparatus.

20 Claims, 16 Drawing Sheets

Fig. 4A
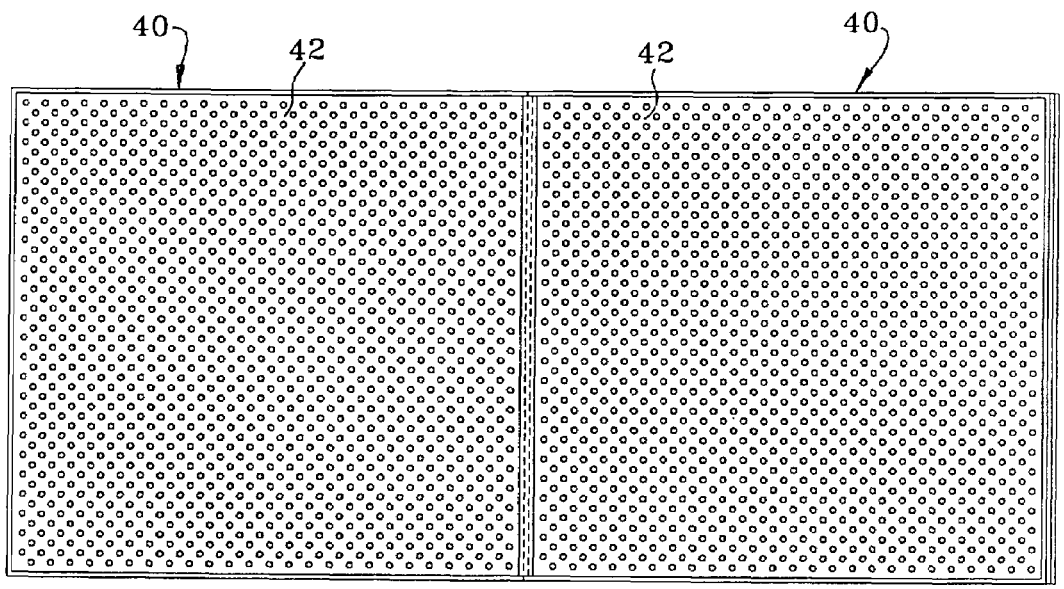
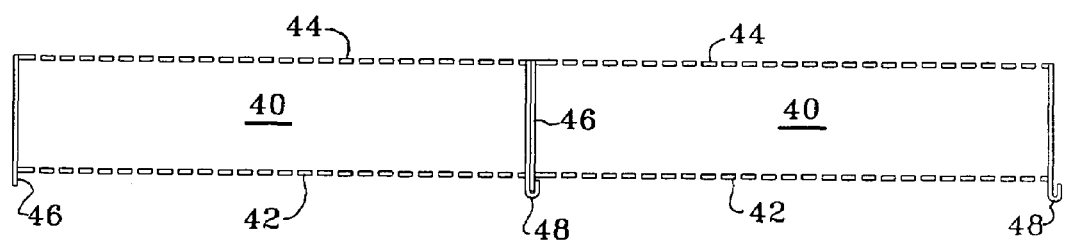
Fig. 4B

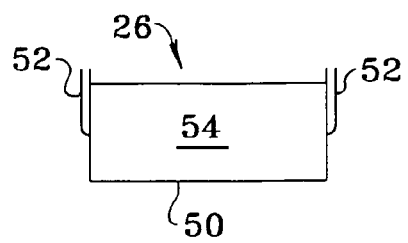
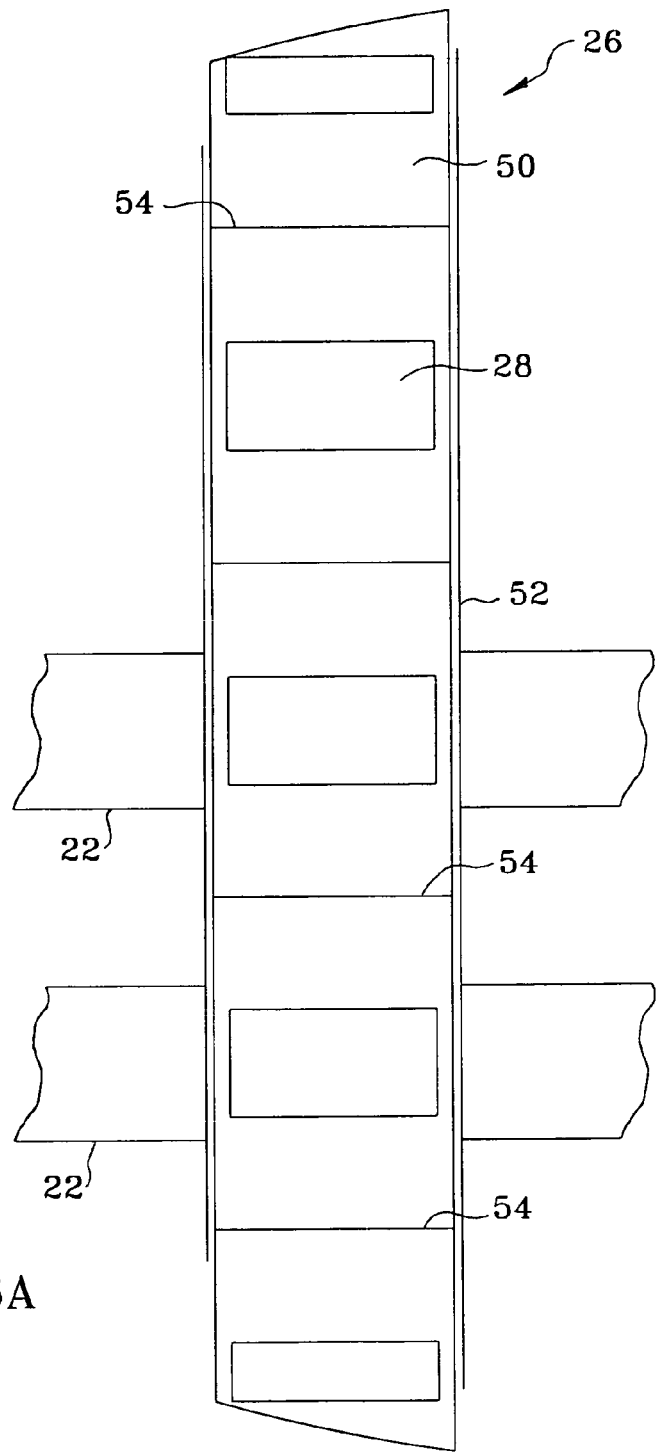

CO-CURRENT VAPOR-LIQUID CONTACTING APPARATUS

CROSS REFERENCE TO RELATED APPLICATION

This application claims priority from Provisional Application No. 60/751,041 filed Dec. 16, 2005, the contents of which are hereby incorporated by reference in their entirety.

FIELD OF THE INVENTION

The invention relates to an apparatus useful for performing fractional distillation or other forms of vapor-liquid contacting for mass and/or heat transfer. The invention more specifically relates to a process and apparatus providing a high capacity and high efficiency co-current flow fractionation apparatus useful in fractional distillation columns to separate volatile chemicals such as hydrocarbons.

BACKGROUND OF THE INVENTION

Vapor-liquid contacting devices, such as fractionation trays and packings, are employed to perform an almost endless variety of separations in the petroleum and petrochemical industries. For the purposes of this application, the terms "vapor" and "gas" are used interchangeably. Fractionation trays are used, for example, in the separation of many different hydrocarbons such as paraffins, aromatics and olefins. Trays are used to separate specific compounds such as different alcohols, ethers, alkylaromatics, monomers, solvents, inorganic compounds, atmospheric gases, etc. in the separation of broad boiling mixtures such as petroleum derived fractions including crude oil, naphtha, and LPG. Vapor-liquid contacting trays are also used to perform gas processing, purification, and absorption. A wide variety of trays and other contacting devices having differing advantages and disadvantages have been developed.

Fractionation trays and packings are the predominant form of conventional fractional distillation apparatus. They are widely used in the chemical, petrochemical and petroleum refining industries to promote vapor-liquid contacting performed in fractionation columns. The normal configuration of a fractionation column includes about 10 to 250 individual trays. Often the structure of each tray in the column is similar, but it is also known that the structures may alternate on vertically adjacent trays. Trays are mounted horizontally, typically at uniform vertical distances referred to as the tray spacing of the column. This distance may vary within different sections of the column. The trays are often supported by a ring welded to the inner surface of the column.

Fractional distillation has traditionally been conducted in cross flow or counter current contacting devices having an overall downward liquid flow and upward vapor flow. At some point in the apparatus the vapor and liquid phases are brought into contact to allow the vapor and liquid phases to exchange components and approach equilibrium with each other. The vapor and liquid are then separated, moved in the appropriate direction and contacted again with another quantity of the appropriate fluid. In many conventional vapor-liquid contacting devices, vapor and liquid are contacted in a cross flow arrangement at each stage. An alternative apparatus differs from traditional multi-stage contacting systems in that while the overall flow in the apparatus continues to be countercurrent, each stage of actual contacting between the liquid and vapor phases is performed in a co-current mass transfer zone.

During the fractional distillation process using conventional trays, vapor generated at the bottom of the column rises through a large number of small perforations spread over the decking area of the tray, which supports a quantity of liquid. The passage of the vapor through the liquid generates a layer of bubbles referred to as froth. The high surface area of the froth helps to quickly establish a compositional equilibrium between the vapor and liquid phases on the tray. The froth is then allowed to separate into vapor and liquid. During mass transfer, the vapor loses less volatile material to the liquid and thus becomes slightly more volatile as it passes upward through each tray. Simultaneously the concentration of less volatile compounds in the liquid increases as the liquid moves downward from tray to tray. The liquid separates from the froth and travels downward to the next lower tray. This continuous froth formation and vapor-liquid separation is performed on each tray. Vapor-liquid contactors therefore perform the two functions of contacting the rising vapor with liquid and then allowing the two phases to separate and flow in different directions. When the steps are performed a suitable number of times on different trays, the process leads to separation of chemical compounds based upon their relative volatility.

Many different types of vapor-liquid contacting devices including packing and trays have been developed as a result of the desire to improve equipment having this utility in the petroleum refining, chemical, and petrochemical industries. Different apparatus tend to have different advantages. For instance, multiple downcomer trays have high vapor and liquid capacities and the ability to function effectively over a significant range of operating rates. Structured packing tends to have a low pressure drop making it useful in low pressure or vacuum operations. Two very important characteristics of vapor-liquid contacting equipment in which improvement is always sought are capacity and efficiency. A co-current contacting device is believed to be one apparatus for achieving high capacity through using vapor-liquid separation devices such as demisters or centrifugal vanes for enhancing vapor-liquid separation at each stage. The co-current contacting device can also achieve high mass transfer efficiency through the co-current contacting of fine liquid droplets with vapor.

A co-current vapor-liquid contacting apparatus having a parallel arrangement is taught by U.S. Pat. No. 6,682,633 which discloses a modular apparatus for co-current contacting of vapor and liquid in a number of structural units which are placed in horizontal layers in a column or other enclosure. The structural units are horizontally spaced apart in each stage or layer to provide spaces for the downcomers from the modules of the next higher stage. The structural units of each stage are aligned parallel to the structural units in the superior and inferior stages. The downcomers deliver the liquid to contacting channels, with the contacting channels discharging the vapor and liquid into separation chambers at the top of a module. Vapor flows upward from the separation chambers to the contacting channel of the next higher module and liquid flows down through a single central downcomer to the next lower contacting channel.

U.S. Pat. No. 5,837,105 and related U.S. Pat. No. 6,059,934 disclose a fractionation tray having multiple co-current contacting sections spread across the tray. Liquid collected in a sump flows through a plurality of downcomers to the next lower tray where it is entrained in vapor rising through vapor openings of the tray and passed into one of two de-entrainment devices on the tray. The liquid from each de-entrainment device then flows into a sump. A number of arrangements are taught including parallel and non-parallel alignment of stages.

If maldistribution of liquid or vapor occurs in a vapor-liquid contacting apparatus having a parallel arrangement on adjacent stages, it is known that the fluid may not be readily redistributed along the length of the apparatus. Thus, maldistribution of liquid or vapor may propagate from one stage to the next, reducing the capacity and efficiency of the apparatus. Therefore, what is needed is a co-current vapor-liquid contacting device with an additional degree of freedom for fluid redistribution. In addition, the use of perforated decks in a relatively small area within the column may greatly increase pressure drop, even if the fractional open area is high. Therefore, what is needed is an improved co-current vapor-liquid contacting device with non-parallel stages and structures for transferring liquid from one stage to the next inferior stage without reducing liquid handling capability. Further, such a device with an optimum use of column space for fluid flow and contacting is needed for achieving high capacity, high efficiency and low pressure drop.

SUMMARY OF THE INVENTION

The invention is a novel high capacity and high efficiency co-current vapor-liquid contacting apparatus for use in fractionation columns and other vapor-liquid contacting processes. The apparatus is characterized by an arrangement of contacting modules in horizontal stages rather than tray-like construction. The modules of one stage are rotated to be non-parallel with respect to the modules of an inferior stage, a superior stage, or both. The contacting modules include at least a liquid distributor and a demister which define a contacting volume. Ascending vapor enters the contacting volume and entrains liquid that is discharged from the liquid distributor carrying it co-currently to the demister. The demister, also known as a vapor-liquid separator, partitions the vapor and liquid such that the vapor and liquid can separately flow upward and downward respectively after being contacted. Liquid from the demister flows onto a receiving pan and through a duct. Each of the ducts associated with a single receiving pan directs the liquid into a separate liquid distributor, which is associated with an inferior contacting stage. Variations relate to the number and design of the individual elements such as the demister, liquid distributor, ducts, and contacting volumes, and the overall arrangement of the apparatus.

In one embodiment, the invention includes an apparatus for performing co-current vapor-liquid contacting. The apparatus comprises a plurality of stages having one or more contacting modules. The contacting module includes a liquid distributor having an outlet proximate to a contacting volume, a receiving pan oriented substantially parallel to the liquid distributor, at least one duct, and a demister. Each of the ducts has an upper end in fluid communication with the receiving pan, and a lower end in fluid communication with a separate inferior liquid distributor. The demister has an inlet surface that is proximate to the contacting volume and an outlet surface that is superior to the receiving pan. The contacting module of at least one stage is rotated with respect to the contacting module of another stage.

In another embodiment, the invention includes an apparatus for performing co-current vapor-liquid contacting. The apparatus comprises a plurality of stages having at least one contacting module and a plurality of receiving pans. The contacting module includes a pair of substantially parallel spaced apart demisters, a liquid distributor located between the pair of demisters. The liquid distributor cooperates with the demisters to define a contacting volume and has an outlet in fluid communication with the contacting volume. Each demister of one module has an inlet surface in fluid communication with the contacting volume and an outlet surface superior to separate receiving pans of the stage. At least a portion of the contacting module is located between the pair of receiving pans associated with the pair of demisters. Each receiving pan has at least one duct and each duct of one receiving pan provides fluid communication to a separate inferior liquid distributor. At least one of the stages is rotated with respect to another stage so that the contacting modules of the two stages are in non-parallel alignment with respect to each other.

In another form, the invention includes a method for vapor-liquid contacting. The method includes the steps of passing an ascending vapor stream into a contacting volume, and directing liquid through an outlet of a first liquid distributor into the contacting volume. Entraining the liquid in the vapor stream within the contacting volume to flow co-currently into a demister. Separating the liquid from the vapor stream in a demister. Delivering liquid exiting the demister to a receiving pan and passing the vapor stream exiting the demister to a superior contacting volume. Passing the liquid from the receiving pan through at least one duct that directs the liquid into an inferior liquid distributor. Each duct associate with a receiving pan directs the liquid into a separate inferior liquid distributor. The inferior liquid distributor is non-parallel with respect to the first liquid distributor.

An advantage of the present invention is that the non-parallel orientation of one contacting stage with respect to a vertically adjacent stage adds a degree of freedom for distributing the vapor and liquid in multiple directions. If a maldistribution of liquid or vapor occurs, the fluid is readily redistributed. Thus, a maldistribution of liquid or vapor is eliminated in as few as one or two stages, thereby increasing the capacity and efficiency of the apparatus over the conventional art. The present invention also provides for relatively unobstructed passage of the vapor ascending from an inferior stage to a superior contacting volume which has the advantage of a lower pressure drop compared to previous apparatus.

BRIEF DESCRIPTION OF THE DRAWINGS

FIGS. 4A and 4B are views of the demisters of FIG. 3.

FIG. 6A is a top schematic of a receiving pan of FIG. 1.

FIG. 6B is a cross-sectional schematic of a receiving pan of FIG. 1.

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
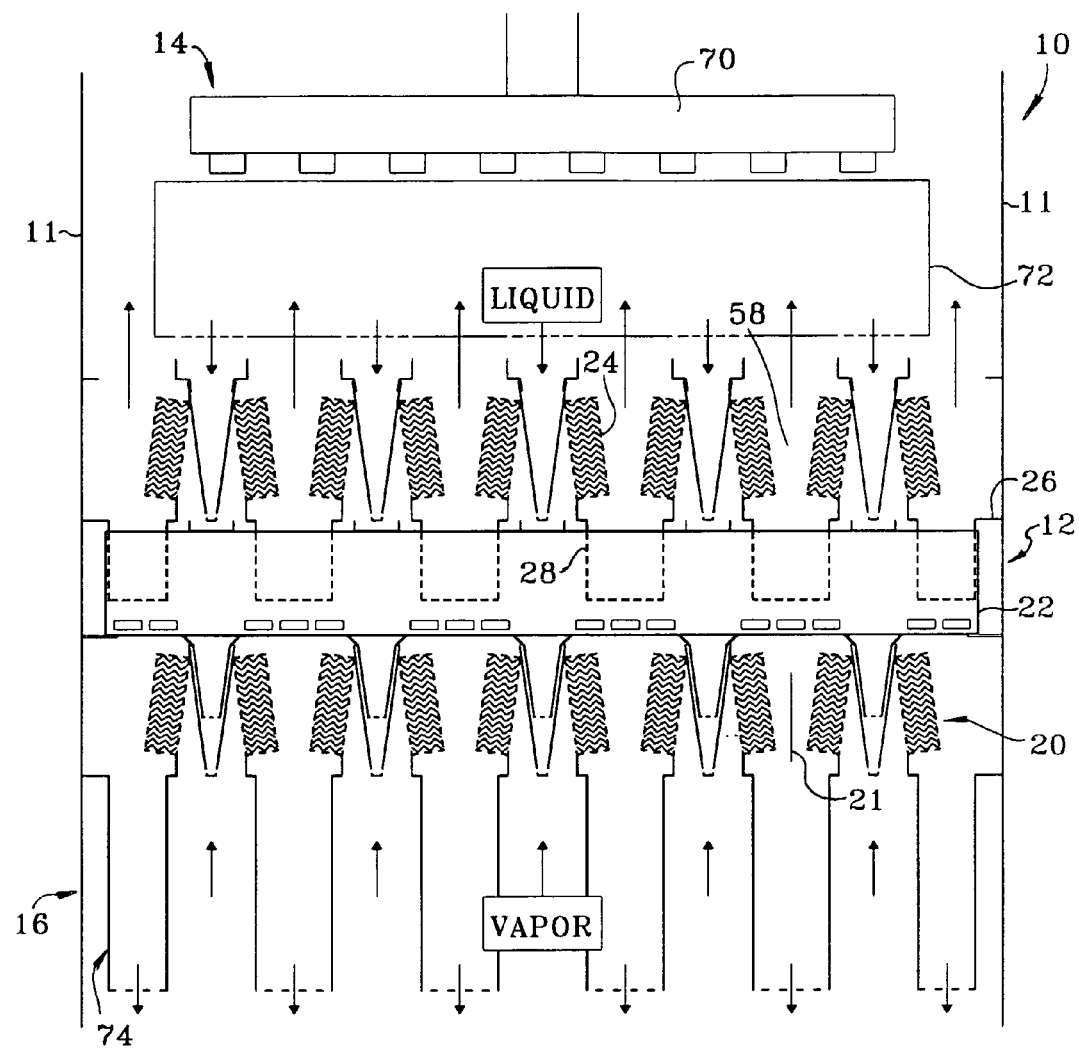
FIG. 1 is a cross-sectional schematic of a vapor-liquid contacting column employing co-current contacting modules of the present invention.

Referring to FIG. 1, there is shown an embodiment of the co-current vapor-liquid contacting apparatus of the present invention within a vessel 10. The vessel 10 may be for example a distillation column, absorber, direct contact heat exchanger, or other vessel used to conduct vapor-liquid contacting. The vessel 10 contains contacting stages 12 according to the subject invention and two optional collector/distributors. An upper portion of the column contains top collector/distributor 14 and a lower portion of the column contains bottom collector/distributor 16. For simplicity, only three contacting stages are shown. As is well known in the art, a distillation column may contain several sections. Each section may contain numerous contacting stages, and there may be a plurality of fluid feeds and/or withdraws between and/or within sections. Also, different contacting devices such as co-current contacting devices and other conventional distillation devices may be mixed in the same and/or different sections of the same column. The vessel 10 includes an outer shell 11 that is typically in the form of a cylinder, or, alternatively, any other shape.

In the present embodiment, shown in the FIG. 1, each contacting stage 12 is oriented with a 90° rotation with respect to the directly superior and inferior stages. Thus, each contacting stage 12 distributes liquid in a direction that is orthogonal to the immediately superior stage and reduces maldistribution of the liquid. In other embodiments, vertically adjacent contacting stages may be oriented with a rotation of between 0° and 90°. In further embodiments, the contacting stages are rotated between 9° and 90°. The degree of rotation between contacting stages may be the same at every stage or it can vary. That is, the invention also encompasses embodiments in which the degree of rotation between vertically adjacent contacting stages varies. In the illustrated embodiment, each contacting stage 12 comprises a plurality of contacting modules 20 and receiving pans 26.

Figure 2:
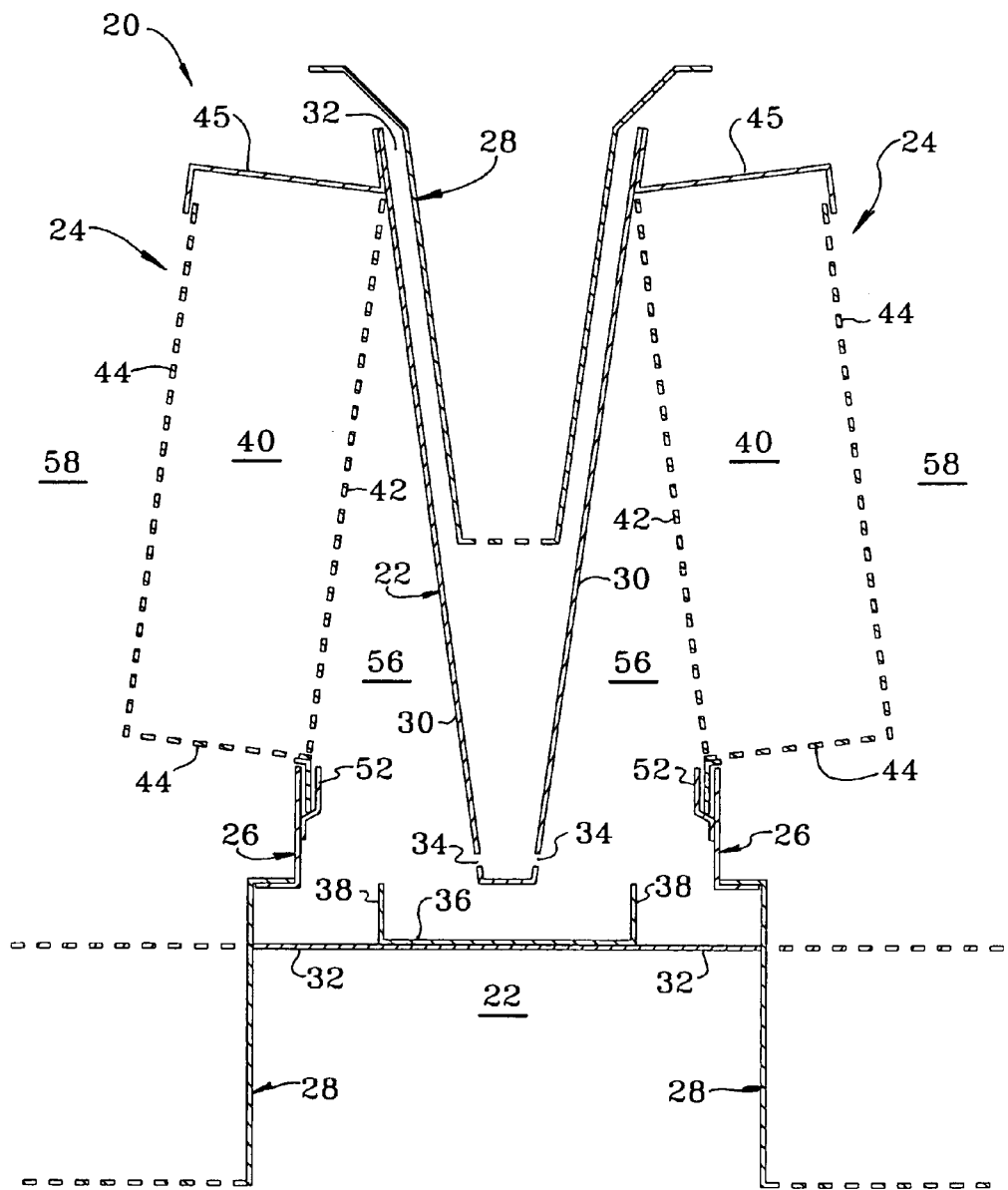
FIG. 2 is a cross-sectional schematic of a module.
Figure 3:
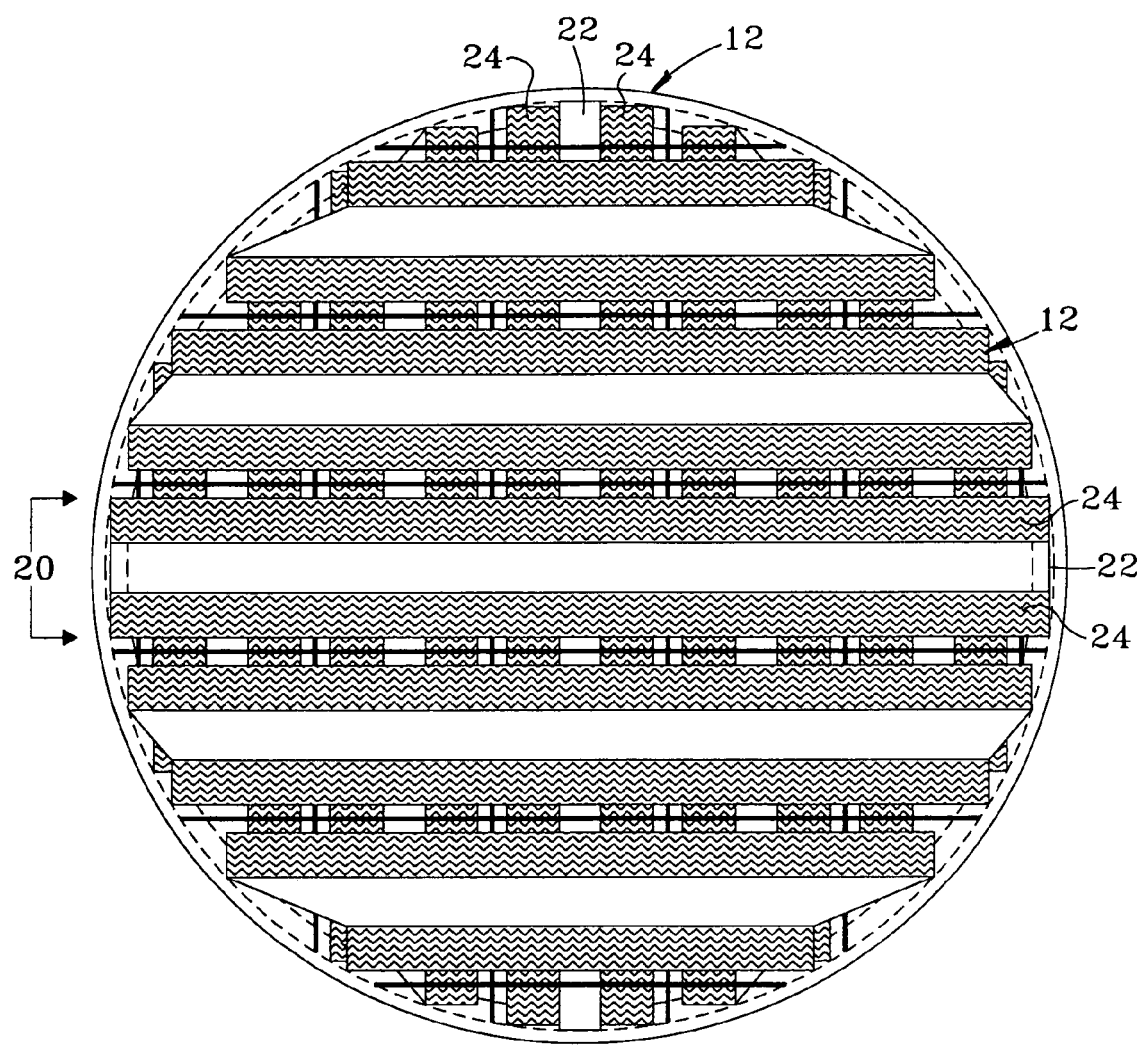
FIG. 3 is a top view of a stage of the column of FIG. 1 showing the demisters and the liquid distributors.
Figure 5:
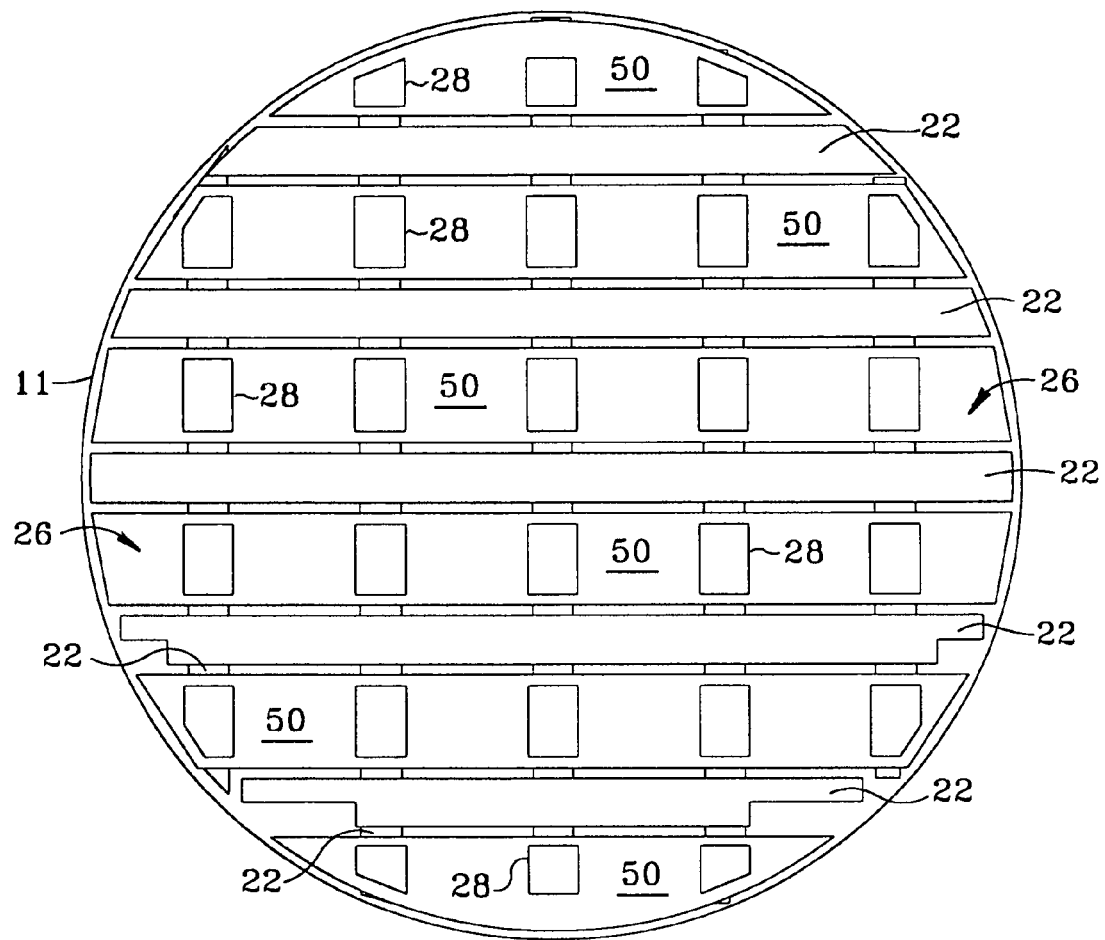
FIG. 5 is a top view of a stage of the column of FIG. 1 showing the receiving pans and the liquid distributors.

As shown in FIGS. 2, 3, and 5, the contacting modules 20 of this embodiment include a liquid distributor 22 located between a pair of demisters 24. The liquid distributor and demisters cooperate to define the co-current fluid contacting volume 56. In addition to the contacting modules 20, each stage also includes a plurality of receiving pans 26 which have a plurality of ducts 28. FIG. 5 illustrates a top down view of two adjacent stages in which the demisters have been removed to more clearly show the arrangement of receiving pans 26, ducts 28, and liquid distributors 22. At each stage, the receiving pans 26 are substantially parallel and are spaced apart across the cross sectional area of the vessel. The liquid distributor 22 of a module is located between each pair of adjacent receiving pans 26 resulting in a alternating pattern of receiving pans 26 and modules 20. Receiving pans located between two modules are herein termed central receiving pans, and receiving pans located between a module and the vessel shell are herein termed terminal receiving pans. It can be seen that central receiving pans are shared by two adjacent modules. In another embodiment not illustrated, a pair of receiving pans is incorporated into each contacting module. When such modules are arranged in a substantially parallel alignment across the stage, the modules are adjacent such that there are two receiving pans between each pair of adjacent liquid distributors. A vertical baffle 21 is optionally included between two adjacent contacting modules 20 in order to intercept vapor emanating from the demisters 24 and, in general, to reduce any tendency of the emerging fluids to interfere with each other in the fluid transfer volume 58 above the receiving pans 26. The vertical baffle 21 is situated between and substantially parallel to the demisters 24 of adjacent contacting modules 20.

The liquid distributor 22 of the present embodiment has a liquid distributor inlet 32 in an upper portion and a plurality of outlets 34 in a lower portion. Two sloped liquid distributor walls 30 taper the liquid distributor 22 in the downward direction. The bottom of the substantially V-shaped liquid distributor may be pointed curved or may be flat as shown in FIG. 2. Alternative embodiments having liquid distributors of various different shapes, such as stepped or sloped and stepped, may be envisioned. In further embodiments the cross sectional shape of the liquid distributor may be regular such as rectangular or square, or it may be curved, irregular, or otherwise configured to define the desired contacting volume and deliver the liquid thereto. However, the V-shaped liquid distributor is used in the present embodiment to provide a combination of a large contacting volume between the demisters 24 and liquid distributor walls 30 in the lower portion of each stage 12 and a large liquid distributor inlet 32 in the upper portion for accommodating enlarged ducts 28 to increase liquid handling capability. The liquid distributor inlet 32 is configured to engage the ducts 28. Optional inlet plates 36 are located between vertically adjacent liquid distributors. Liquid distributor inlet plates 36 cover the liquid distributor inlet proximate to the liquid distributor outlets 34 of a superior liquid distributor 22. Two lips 38 on each inlet plate 36 direct liquid from the superior liquid distributor 22 to the volume above the demister 24 where the liquid is entrained by rising vapor. This provides an additional advantage to ensure high efficiency where liquid is prevented from entering the liquid distributor 22 directly from the superior liquid distributor which would by-pass a contacting opportunity.

The liquid distributor outlets 34 are formed by a plurality of slots or other types of perforations arranged in one or more rows proximate to the bottom of the liquid distributor 22. The outlets 34 may be located in the walls 30 and/or the bottom of the liquid distributor. In operation, a liquid level in the liquid distributor provides a seal to prevent the ascending vapor from entering the liquid distributor through the outlets 34. The perforations 34 are preferably distributed along the length of the liquid distributor 22 and they may be arranged such that the perforations are varied in size or number or eliminated in the portions of the liquid distributor 22 that are above an inferior liquid distributor. Thus, arrangement of the liquid distributor outlets may be used as another means to prevent liquid from flowing directly from one liquid distributor into an inferior liquid distributor. Combinations of these and other such means discussed afterwards may be used to prevent this potential for liquid to by-pass a contacting stage.

The demisters 24 run along the length of liquid distributor 22 in rows on either side of the same as is best seen in FIG. 3. It should be noted that the receiving pans are not shown in FIG. 3 to better illustrate the orthogonal relationship of modules in adjacent stages of the present embodiment. The demister rows 24 may be assembled from a plurality of demister units 40 shown in FIGS. 4A and 4B. The demister units 40 may further include a male end plate 46 and a female end plate 48, each of which cooperates with complimentary end plate of an adjacent demister unit 40 to form a seal that substantially prevents fluid leakage through the junction. Such male and female end plates represent one type of interlocking mechanism that may be used to construct a demister row 24 from modular demister units 40. Any known interlocking mechanism may be used. In other embodiments the modular units 40 may be fastened together by other known means such as using bolts, clips, pins, clamps, bands, or welding, or gluing. Mechanisms such as a male and female tab and slot combination can provide advantages for quick assembly and disassembly. The modular configuration of the demisters 24 allows a fabricator to produce demister units 40 in one or a small number of standard sizes to be assembled into demister rows 24 of varying length. Some custom-sized demister units 40 may be required for particularly short demister rows 24 or to match the length of a liquid distributor 22 depending on the dimensions of the apparatus and the variety of standard size demister units 40 available. The modular design has the further advantage of easing the assembly of the contacting module 20 since the demister units 40 are lighter than a demister row formed of a single unit. However, in other embodiments a single demister unit 40 defines a complete demister row 24.

The demister units 40 comprise a vapor-liquid separation structure 41 which may be of conventional design. Various known designs are used to de-entrain liquid droplets from a vapor stream. One example is mist eliminators, such as a vane type demister which have various for channels and louvers such that the fluid stream passing through the demister must undergo several changes in direction which cause the entrained liquid droplets to impact portions of the separation structure 41 and flow downward to the bottom of the demister. Another example of known vapor-liquid separation devices are mesh pads or woven threads. Combinations of these mist eliminator technologies can also be used.

As shown in FIG. 2, various optional elements may cooperate with and/or be incorporated into the demister to further improve the performance and/or structural integrity of the apparatus. For example, a perforated inlet plate 42 as an inlet surface, a perforated outlet plate 44 as an outlet surface, and an imperforate top plate 45 are shown. Perforated plates are one type of flow manipulator that may cooperate with the demister. Other non-limiting examples of flow manipulators include expanded metal, porous solids, mesh pads, screens, grids, mesh, profile wire screens, and honeycombs. It has been found that the fractional open area of the flow manipulators affect both separation efficiency and pressure drop of the demister. The fractional open area of the flow manipulators may vary on different sides and on the same side of the demister to optimize the separation efficiency and pressure drop of the demister. Various types of flow manipulators may be used in a single demister. In other embodiments, flow manipulators are not used on some or any of the inlet and outlet surfaces of the demister.

The perforated inlet plate 42 is proximate the liquid distributor 22. The perforated outlet plate 44 extends the majority of the demister side opposite to the perforated inlet plate 42 and along the bottom of the demister unit 40. The imperforate top plate 45 prevents liquid from leaving the demister unit 40 directly from the top of the unit and increases the vapor-liquid separation efficiency. The imperforate top plate 45 has bent strips on both sides, one following liquid distributor wall 30 for attaching with the wall and the other following the perforated outlet plate 44 of the demister 40 for connecting with the perforated outlet plate 44. It has been found that the imperforate strip extending down a distance from the top of the perforated outlet plate 44 also improves vapor-liquid separation efficiency. In one embodiment, the strip extends to cover about 10% of the height of the demister outlet. In another embodiment the strip extends to about 30% of the height of the demister outlet. In a further embodiment the strip extends to about 50% of the height of the demister outlet.

Each of the receiving pans 26 shown in FIGS. 2, 5, 6A, and 6B include vertically extending lips around a flat base 50. Demister support rails 52 are formed by attaching a formed metal plate to each of the two lips along the longitude of the pan 26. Terminal receiving pans may include only one demister support rail 52. The liquid collected in the receiving pan 26 is directed to the plurality of ducts 28. In an embodiment, the liquid receiving pan 26 includes an optional baffle 54, shown in FIGS. 6A and 6B. The support rails 52 engage the base of the demister units 40 in a particular demister row 24. A support angle attached to the bottom of each demister unit 40 is inserted into the support rail 52 and the top of the demister is fastened to the liquid distributor wall 30, proximate to the liquid distributor inlet 32. The support rails 52 provide structural support for the demister units 40 even before the demister units 40 have been fastened to the liquid distributor 22. In this embodiment, each central receiving pan supports two demister rows 24, one from each of two adjacent contacting modules 20, while the terminal receiving pans that are proximate to the vessel shell 11 support one demister row of the terminal modules of the stage. Thus, a single receiving pan 26 may be shared by two contacting modules. Thus, as described for the present embodiment of the invention, the construction of each stage may be the same in at least part of a column, which simplifies the fabrication and installation of the apparatus.

Figure 7A:
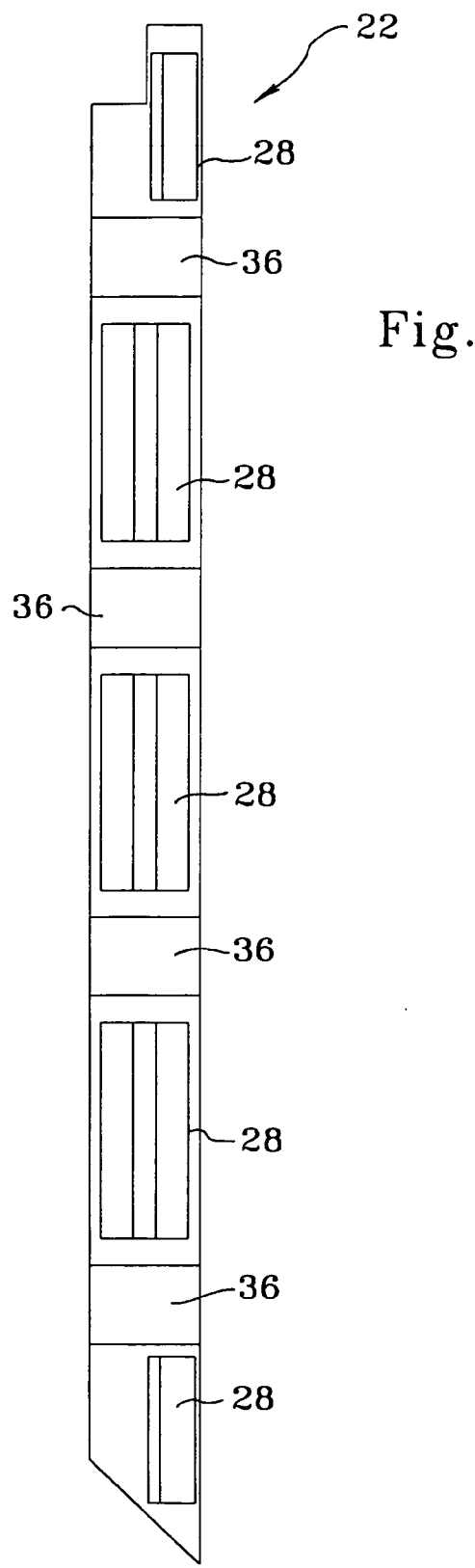
FIG. 7A is a top schematic of a liquid distributor of FIG. 1.

The plurality of ducts 28 extend through the receiving pan 26 into the liquid distributor inlet 32. Each of the ducts 28 that extends through a particular receiving pan 26 directs liquid into a different inferior liquid distributor 22, as is best shown in FIG. 5. In the current embodiment, the top of the duct 28 is flush with the horizontal surface 50 of the receiving pan 26 so that liquid may flow freely from the receiving pan 26 into the duct 28 without any obstruction. In other embodiments the ducts may hang from the receiving pan by having a lip that rests on the flat base 50 of the receiving pan when the ducts are fitted through the openings. The ducts may also be mounted to the underside surface of the receiving pans. Any convention means of connecting the ducts and receiving pans may be used including but not limited to hanging, bolting, welding, and pressure fitting. Gaskets and/or sealants may be used to prevent leakage between the receiving pans and the ducts. In other embodiments the ducts may be at least partially defined by the portion of the flat base of the receiving pan that may be cut and folded or pushed out when the openings are formed. Further, the top mouth of the duct 28 may be enlarged and wider than liquid distributor inlet 32 as shown in FIG. 2 to increase liquid handling capability and reduce chocking tendency at the duct inlet. The sidewalls of the ducts 28 are sloped so that the ducts 28 fit within the liquid distributors 22 and leave a gap for easy installation and vapor venting, which is shown in FIGS. 2 and 7A. Vapor may enter into the liquid distributor 22 with liquid flow from a superior stage or through liquid distributor outlets 34 when the outlets are not completely sealed by the liquid in the liquid distributor 22. If the vapor in the liquid distributor 22 is not properly vented from the liquid distributor top 32, it will be forced into ducts 28, which may choke the liquid flow through the ducts and cause severe entrainment and premature flooding of the apparatus. Therefore, it is an advantage of the present embodiment that the vapor in the liquid distributor 22 is vented through the gaps between ducts 28 and liquid distributor 22 or openings at the top of the liquid distributor 22 between ducts 28. The bottom of the duct 28 is opened with plurality of spouts or one continuous slot or single larger opening to allow liquid to flow into the liquid distributor 22. Under normal operating conditions, the ducts 28 are sealed against vapor flow either dynamically by liquid in the ducts 28 or statically by liquid in the liquid distributor 22.

Figure 8:
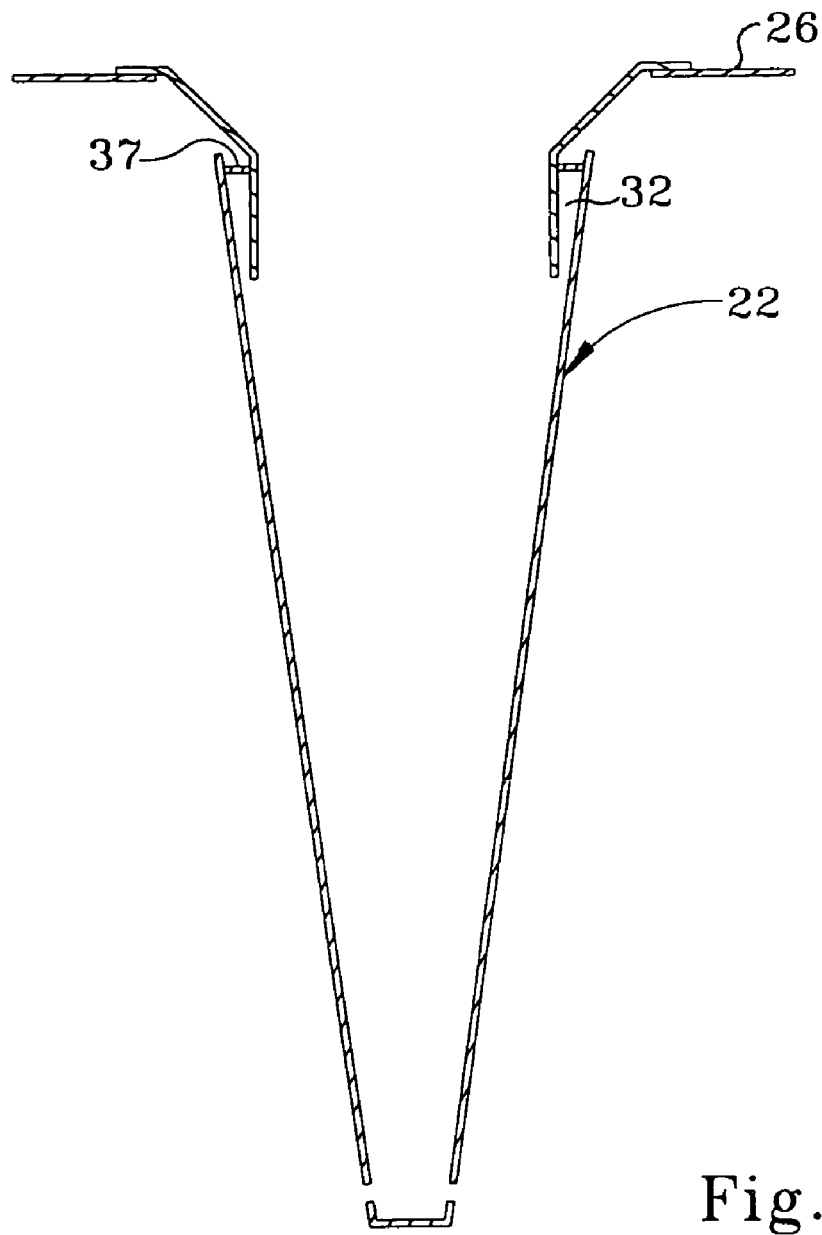
FIG. 8 is a cross-sectional schematic of a liquid distributor of FIG. 1 having an alternative duct.

In an alternative embodiment shown in FIG. 8, the duct 28 extends only slightly below the liquid distributor inlet 32 and has an opening at the bottom that is the same size as the main body of the cross-section of the duct 28. The duct 28 is not sealed by liquid in the duct 28 or by the liquid in the liquid distributor 22. Instead, a sealing plate 37 may be installed over and closing the liquid distributor inlet 32. The ducts 28 are tightly fit through openings on the sealing plate to prevent vapor from getting into the ducts 28 from the top of the liquid distributor 22. The first embodiment has an advantage over this alternative embodiment because if, in the alternative embodiment, vapor enters into liquid distributor 22 through outlets 34 or with liquid flow from a superior stage, the vapor is not vented from the liquid distributor top 32. Instead, the vapor is forced into the ducts 28 to the superior stage, which may cause choking on liquid flow through the ducts.

The volume between the inlet surface of a demister 24 and the adjacent wall 30 of the liquid distributor 22 forms a fluid contacting volume 56, shown in FIG. 2. The fluid contacting continues in demisters units 40 before vapor and liquid are separated. The perforated plate 42 or other flow manipulator at the demister inlet improves fluid flow distribution to the demister and improves vapor-liquid separation. The inlet flow manipulator may also improve fluid contacting and mass transfer. The volume above a receiving pan 26 and between the demister rows 24 that it supports defines a fluid transfer volume 58. The demister rows 24 may be oriented at an angle from vertical as illustrated in FIG. 2 to provide an improved combination of a contacting volume 56, which, in the present embodiment, has a decreasing volume from bottom to top to match with the decreased fluid flow and a fluid transfer volume 58, which, in the present embodiment, has an increasing volume from low to high to match with the increasing vapor flow.

Figure 7B:
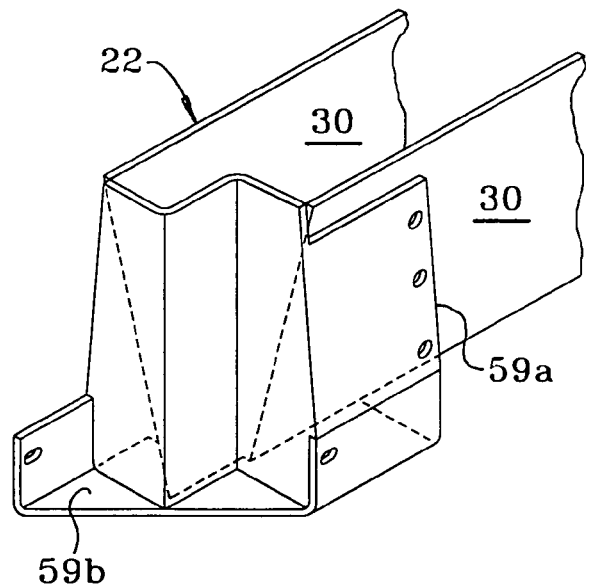
FIG. 7B is an isometric view of the end of a liquid distributor of FIG. 1.

The liquid distributors 22 and the receiving pans 26 may be supported by support rings, not shown, which are affixed to the inner surface of the column wall such as by welding or other conventional means. The liquid distributors 22 and the receiving pans 26 may be bolted, clamped, or otherwise secured to the support ring so that the liquid distributors 22 and the receiving pans 26 are kept in position during operation. In a particular embodiment, the end of the liquid distributor 22 includes an end seal 59a and a bracket 59b as shown in FIG. 7B. The end seal 59a is welded to the end of the liquid distributor 22 to thereby seal the end of the liquid distributor 22. The bracket 59b is seal welded to the bottom of the end seal 59a and bolted, clamped, or otherwise affixed to the support rings. The ends of the demister rows 24 and the receiving pans 26 may be bolted to the end seal 59a and the bracket 59b. In some embodiments, the liquid distributors 22 and the receiving pans 26 are the main supports for the contacting module 20, however, additional support beams may need to be included for substantially large columns. Further, strengthening features such as ribs, braces, increased material thickness, and additional supports may be used with the liquid distributors 22 and the receiving pans 26. The ends of the liquid distributors 22 may be configured in a variety of ways to follow the contour of the vessel shell. For example, FIG. 7A shows the opposing ends of liquid distributor 22 may follow the vessel shell contour in a stepped or continuous fashion.

In some embodiments of the invention the demister is a vane-type mist eliminator having formed or corrugated sheets, flat sheets, and integral louvers. The corrugated sheets and the flat sheets are layered such that the arrangement of sheets and integral louvers creates at least one tortuous fluid flow channel from an inlet to an outlet of the demister. An outer casing or frame is sufficient to hold the sheets or plates together. Some variations include the order of layering the corrugated sheets and flat sheets and whether the louvers are formed in the corrugated sheets, the flat sheets, or both. Further variations include the shape and size of the louvers as well as the shape and the size of the corrugated sheets and the configuration of the outer frame. An advantage this type of mist eliminator is that the use of flat sheets and corrugated sheets with louvers are simply layered to form a self supporting separating structure 41. That is, the layered sheets and fluid flow channels they define are able to maintain the desired spacing without requiring other elements such as spacers, fasteners, and welding. Further, variations in the design of the vanes and louvers of may be provided to achieve high vapor-liquid separation while avoiding unacceptable pressure drops.

Although the outer frame may include solid and perforated plates as described and illustrated for the demisters of FIG. 2, the frame may simply be angled or flat stock that secures the edges of the layered, self supporting sheets. In other embodiments straps or bands define the frame that binds the sheets together. A frame may comprise a variety of these and/or other commonly known elements to clamp the sheets together. The frame may be secured by any well known means. Non-limiting examples include welding, bolting, gluing, tying, crimping, hinges, and pressure fittings. Thus, the frame is sufficient to press the sheets together so that the surfaces or joint spots at which the layered sheets meet are sealed and no significant amount of fluid leaks through the joint spots between the sheets.

Figure 9A:
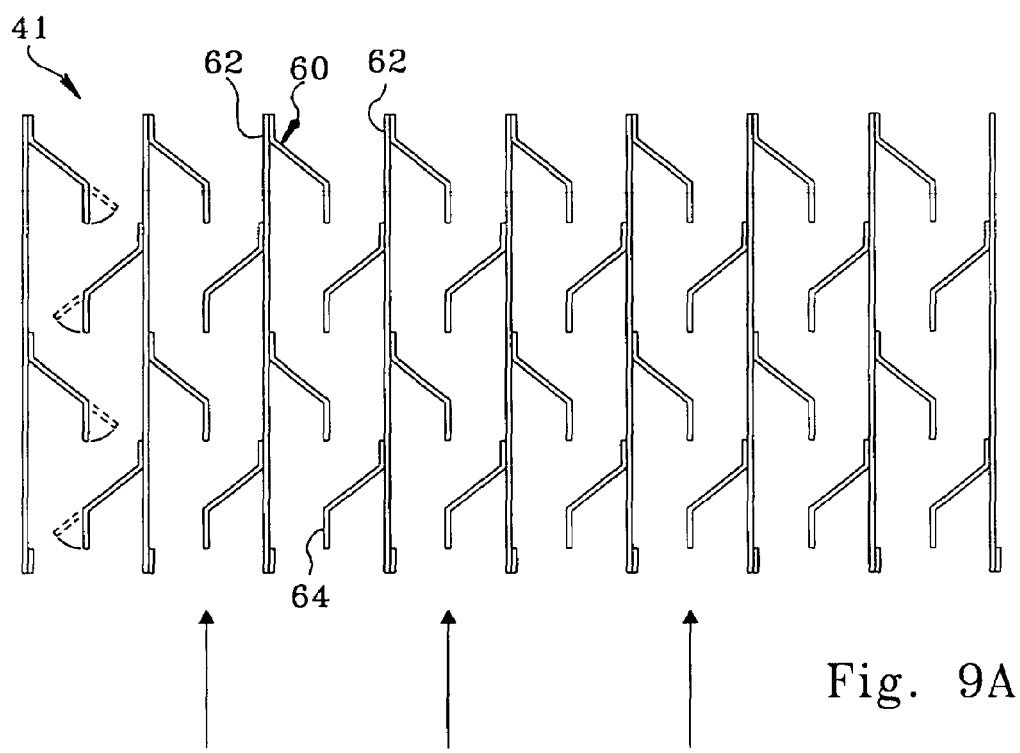
FIGS. 9A-9G are schematic end views of various vapor-liquid separating structures of the present invention.
Figure 9B:
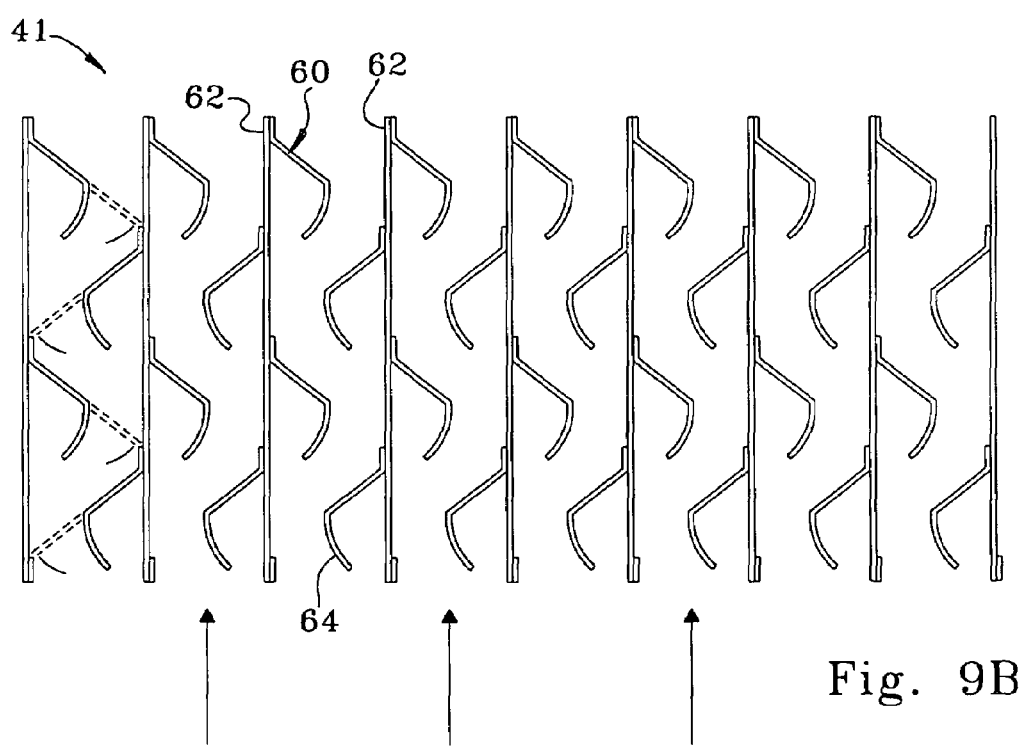
Figure 9C:
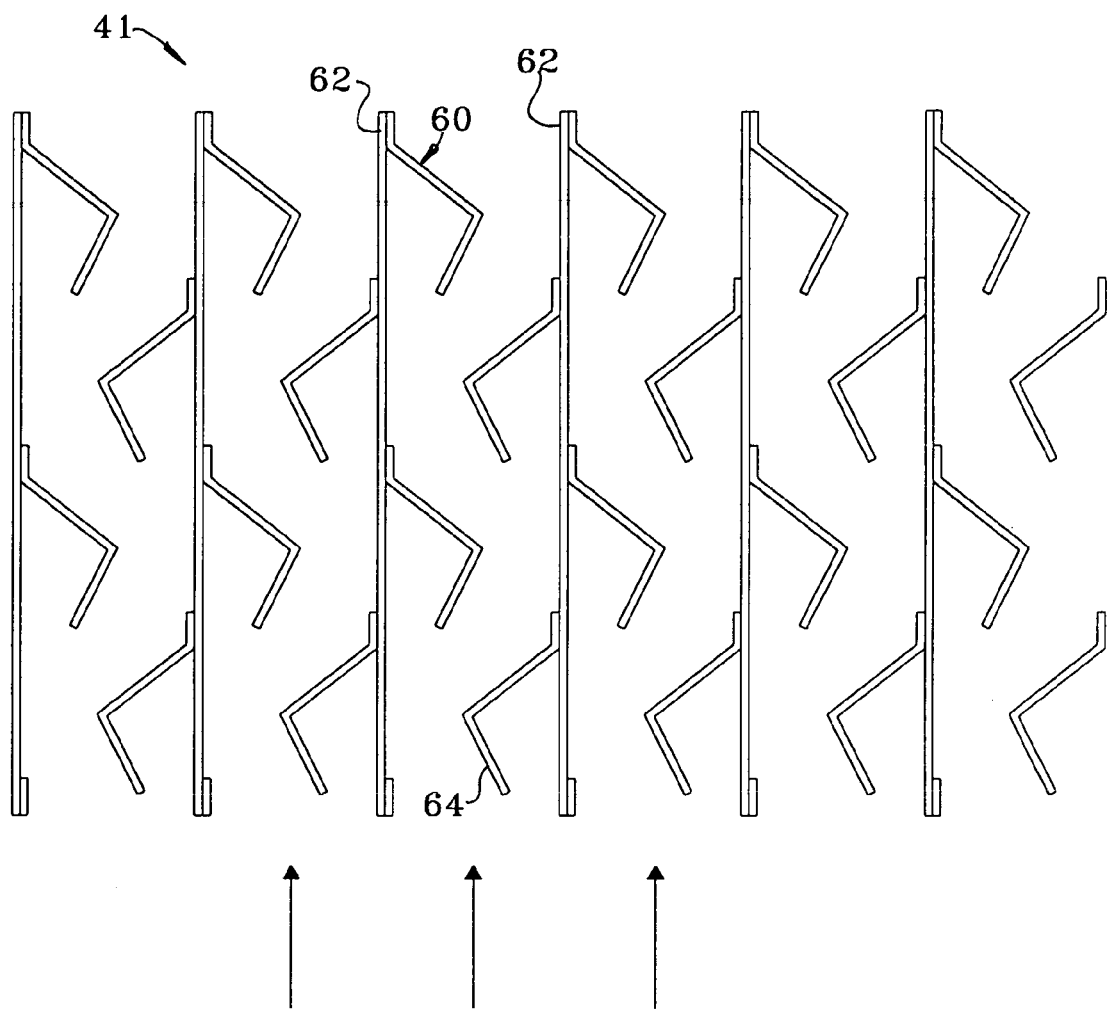

The use of layered corrugated and flat sheets and integral louvers to define a vapor-liquid separating structure of a demister has many variations, a few non-limiting examples of which are shown in FIGS. 9A-9G. The separating structure 41 shown in FIG. 9A includes formed (corrugated) sheets 60, sandwiched between two flat sheets 62. A plurality of integral louvers 64 are formed by cutting and bending the formed sheets 60 as shown by the phantom lines on the left side of FIG. 9A. The cutting and bending of the corrugated sheet 60 forms louvers that extend for a significant length of the sheet leaving the ends of the sheet intact. The vapor with entrained liquid flows generally in the direction of the arrows and through the spaces in the formed sheet 60 left by the formation of the louvers 64. The liquid droplets are trapped by the pockets that are formed by the louvers 64 and thus separated from the vapor as the vapor-liquid mixture passing through the fluid flow channels of the demister is required to change direction several times. The vapor continues through the spaces and the liquid drains downward along the formed sheets 60 to the lower portion of the perforated outlet plate 44. The separating structure 41 in FIG. 9B shows a similar structure having formed sheets 60 and flat sheets 62, however, the louvers 64 are rounded. The rounded shape reduces the pressure drop through the plates. A further design that reduces the pressure drop through the plates uses slanted louvers 64 shown in FIG. 9C. FIG. 9C shows spacing or separation between the corrugated sheets 60 and flat sheets 62 to clearly distinguish the layering of the two types of sheets. This spacing is eliminated when the outer frame secures the layered sheets together and the demister is complete.

Figure 9D:
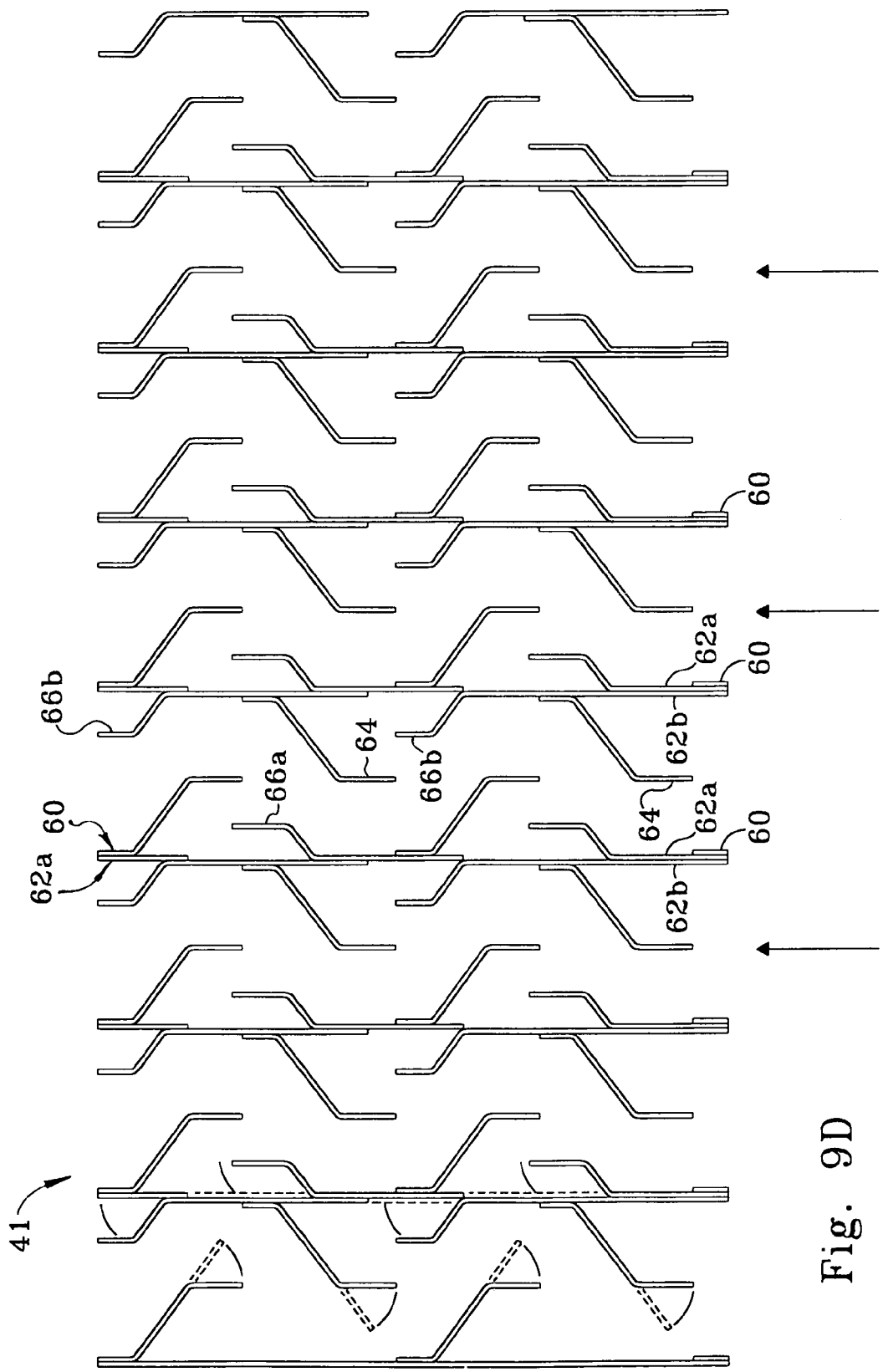
Figure 9E:
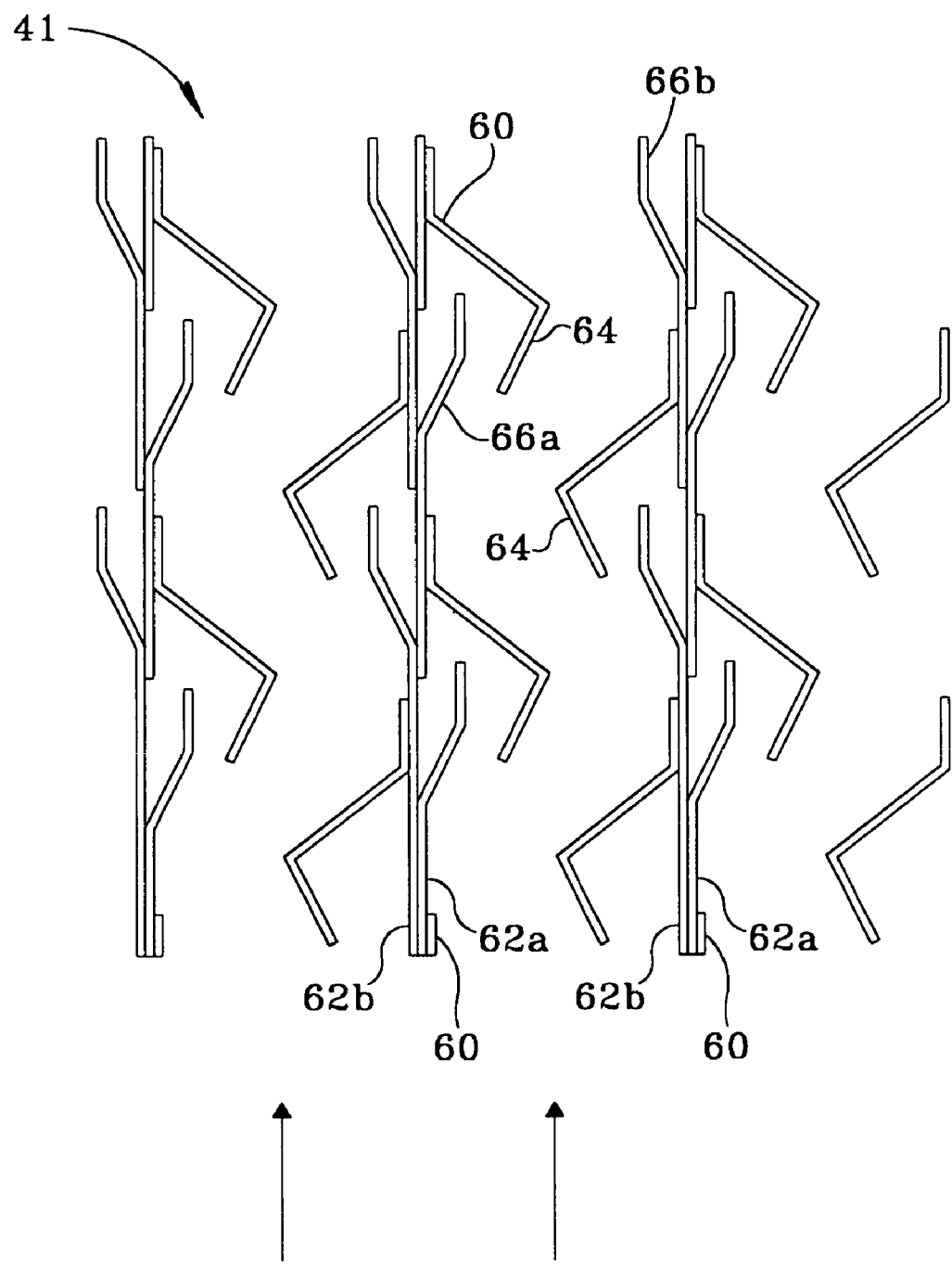
Figure 9F:
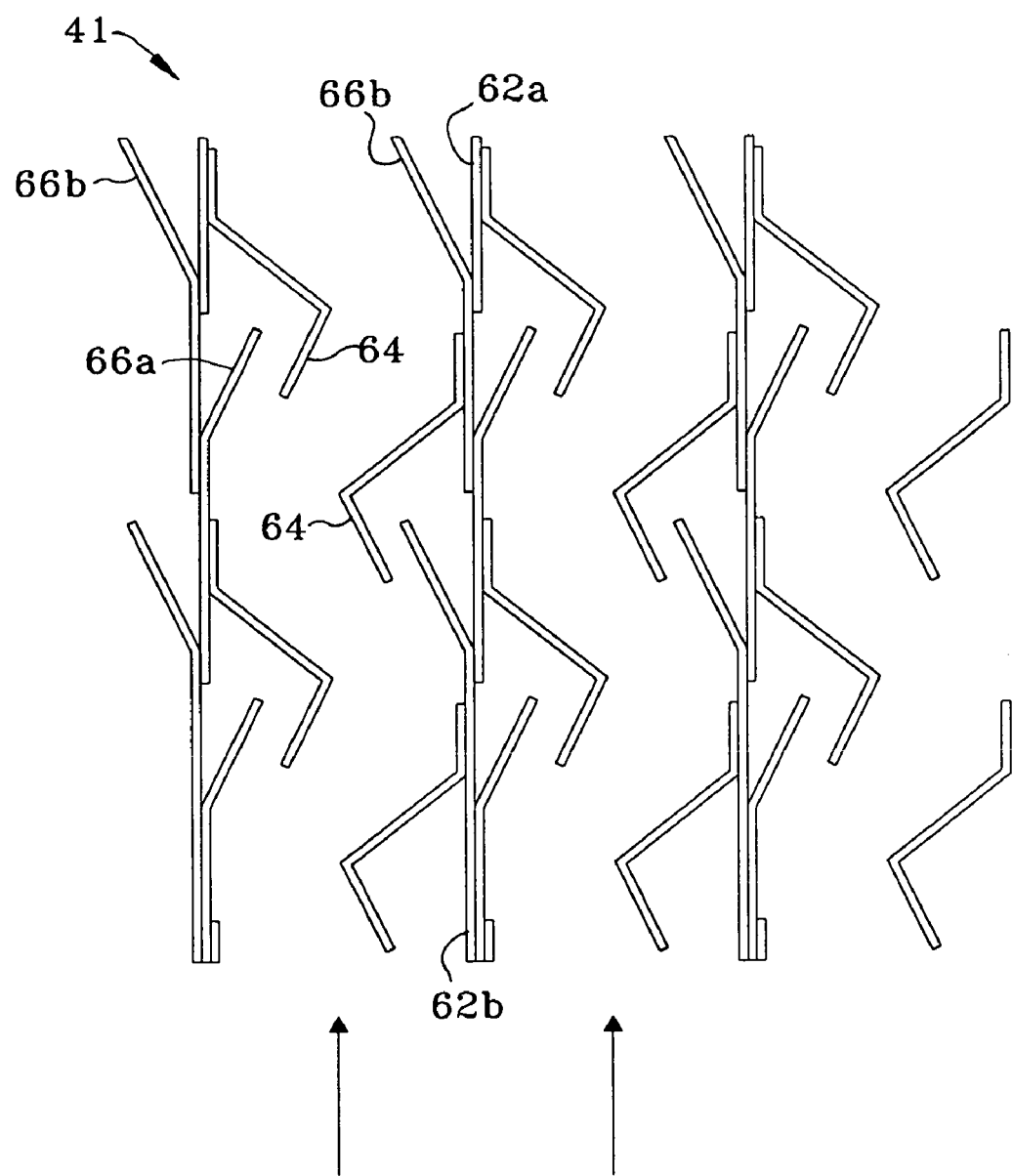
Figure 9G:
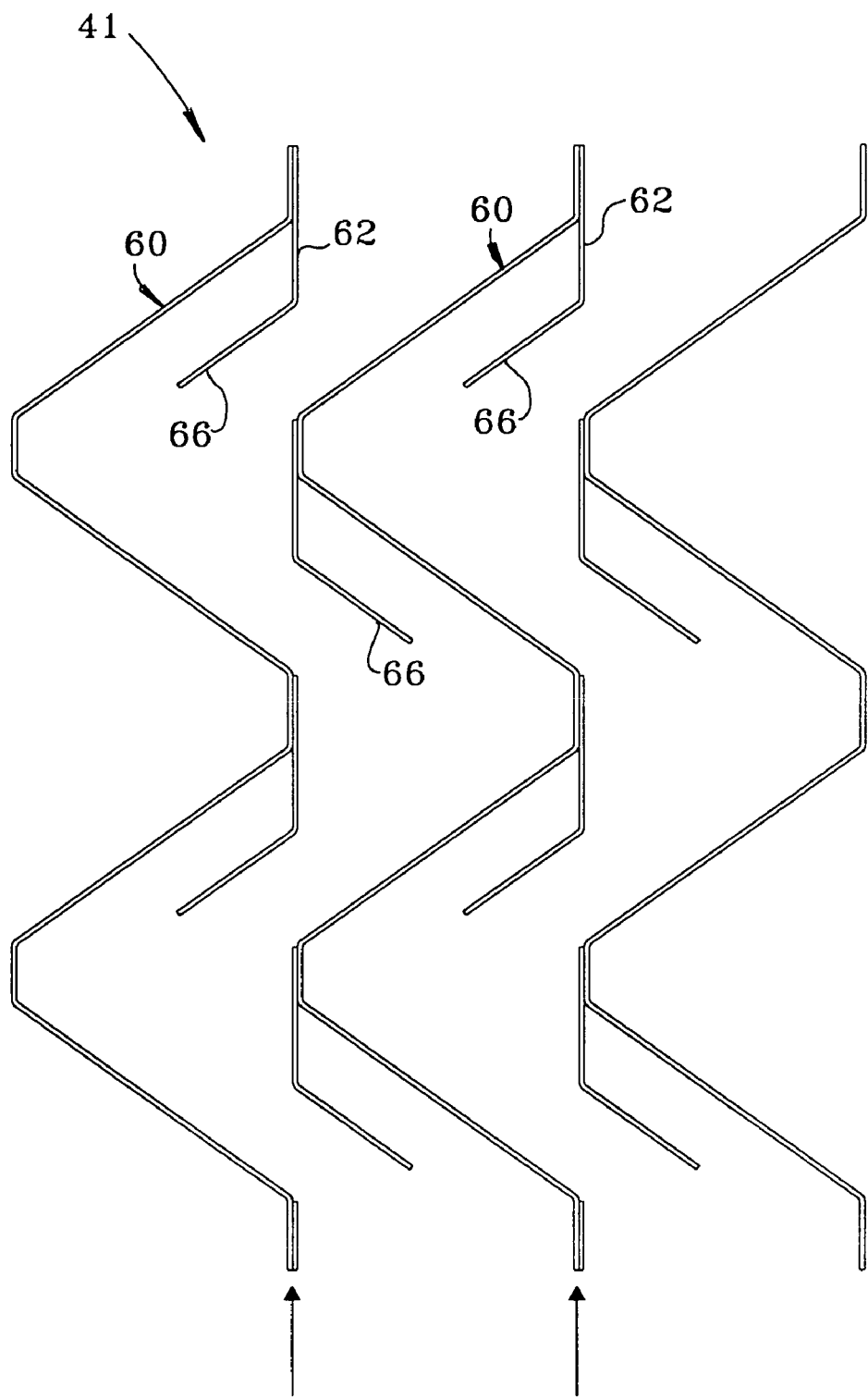

The separating structure 41 in FIG. 9D includes the formed sheet 60 having louvers 64 as well as two flat sheets 62a and 62b between the corrugated sheets 60. The flat sheets 62a and 62b include louvers 66a and 66b. The configuration results in pockets facing both towards and away from the direction of the fluid flow, which reduces liquid re-entrainment and increases flow throughputs. An alternative embodiment shown schematically in FIG. 9E is similar to the separation structure 41 of FIG. 9D, however, slanted louvers 64 are used to reduce pressure drop through the plates. A further modification of the separating structure 41 of FIG. 9E is shown in FIG. 9F and includes slanted louvers 64 and strait louvers 66a and 66b. In a further alternative embodiment of the separating structure 41, shown in FIG. 9G, the formed sheet 60 contains no louvers and the flat sheet 62 includes louvers 66. In other embodiments not illustrated the louvers may have multiple bends. To facilitate fabrication and installation the demisters including their separating structure used in the invention will usually have the same configuration. Likewise, the configuration of individual fluid flow channels in a demister will be uniform. However, neither of these is required. For example the terminal demisters may have a different configuration than the central demisters and the fluid flow channels proximate the end plates may be differently configured than other flow channels of the same demister. Additional details of vane-type mist eliminator devices having formed or corrugated sheets, flat sheets, and integral louvers can be found in co-pending U.S. application Ser. No. 11/305,068 which is hereby incorporated by reference in its entirety.

In alternative embodiments, the demister modules 40 use conventional separating structures, which have many possible variations in design. An important factor is its effectiveness in separating entrained liquid from a flowing vapor stream. Presently this is believed related to the provision of the multiple obstructions in the fluid flow which cause the liquid droplets to impact a solid surface. The dead end nature of the obstructions shown in the figures may lead to the formation of relatively quiescent regions, which also promote liquid separation.

In some embodiments of the invention one or more collector/distributors may be employed. Such devices are not required by the invention but they provide an advantage by properly directing the vapor and/or liquid flows to maximize the vapor-liquid contacting and separation in each stage of the apparatus. For example, the top collector/distributor 14 is shown in FIG. 1 and includes a pipe distributor 70 and a trough distributor 72. The pipe distributor 70 and trough distributor 72 direct liquid into the liquid distributors 22 of the top contacting stage 12. The top collector/distributor 14 also reclaims vapor exiting from the demister rows 24 of the top stage 12. The reclaimed vapor may be passed to a subsequent process or to a condenser to be reintroduced to the column in part as a reflux liquid. Without the top collector/distributor or other equivalent means, downward flowing liquid could flow into the fluid transfer volumes 58 and thus be entrained back to above the top stage or by-pass the top stage vapor-liquid contacting volumes depending on vapor velocity in the fluid transfer volumes 58. Such liquid flow may also disrupt the upward vapor flow and cause inefficiencies in one or more inferior contacting stages.

The ducts 74 of the bottom stage discharge liquid to the column sump. The vapor may be distributed between the ducts 74 rather than below them to reduce vapor-liquid contacting and entrainment. The reclaimed liquid in the column sump may be communicated to a subsequent process or to a reboiler to be reintroduced to the column in part as a vapor. The ducts 74 on the bottom stage may be designed differently than the rest of the stages. For example, one continuous duct 74 may be used in place of a plurality of ducts 74 under a receiving pan 26. Alternatively, ducts are installed near the ends of the receiving pan 26 leaving most of the middle space below bottom stage empty for vapor flow. The openings on the receiving pan 26 are modified accordingly. The ducts 74 of the bottom stage may also be connected to the liquid distributors 22 instead of receiving pans 26 for directing liquid directly from the liquid distributors to the column sump. In this case, no vapor-liquid contacting occurs in the bottom stage, and the bottom stage is used mainly for de-entrainment in case the entrainment from up-flow vapor is high. In addition to the top and bottom collector/distributors discussed above, additional collector/distributors may provide a benefit at any point in the column at which a fluid stream is being introduced or withdrawn such as the one or more feed streams and/or any other product streams such as side cuts. A chimney tray with liquid distributors and vapor risers may be used in the column for fluid introduction/distribution/withdraw or where there is a significant change in the design of the vapor-liquid contacting devices such as between two column sections.

The fluid flow of a contacting module 20 of a middle stage 12 is described hereinafter. The liquid from a superior stage is directed into the liquid distributor 22 by several superior receiving pans 26 through the ducts 28. The liquid exits the liquid distributor 22 through liquid distributor outlets 34 and enters the fluid contacting volume 56. The upward vapor velocity is high in the contacting volume 56 and the liquid entering the contacting volume 56 is entrained by the vapor. A portion of the liquid entering the contacting volume 56 may fall onto the inlet plate 36 on the top of an inferior liquid distributor 22. The inlet plates 36, with lips 38, direct the liquid to the space having a high vapor velocity where the liquid is entrained by the vapor back into the contacting volume 56. The inlet plate 36 on an inferior liquid distributor prevents the shortcut of liquid flow from a superior liquid distributor to the inferior liquid distributor without contacting with vapor.

The entrained liquid is carried upward by the vapor into the inlet surfaces 42 of the demister units 40. The vapor and liquid are separated by the separating structures 41 within the demister units 40 and the vapor exits the demister units 40 through the outlet surface 44 into the fluid transfer volume 58. The vapor then continues upward to a contacting volume 56 of a superior contacting stage 12. The liquid exits the demister units 40 through the bottom portion of the outlet surface 44 and flows onto the receiving pan 26. The receiving pan 26 directs the liquid into the plurality of ducts 28, each of which ducts 28 direct the liquid into a different inferior liquid distributor 22.

In an alternative embodiment, the contacting stages 12 are arranged in a plurality of sections having parallel stages similar to those described in U.S. Pat. No. 6,682,633. However, each of the sections of parallel stages is rotated with respect to the superior and inferior stages. The stage at the transition from one section to another includes features according to the subject invention to enable proper fluid flow between the non-parallel sections.

The ends of the contacting module 20, that is, the terminal portions of the module 20 which face the inner surface of the wall 11 of the enclosing vessel, may be sealed to prevent unintended vapor or liquid bypassing of the contacting apparatus. In this embodiment, the ends of the module 20 are tapered or curved to conform to the curvature of the enclosing structure. Alternately, the ends of the modules 20 are flat and a horizontal imperforate extension plate spans the gap from the module 20 to the enclosing vessel wall.

Those skilled in the art will recognize that there are many more variations which can be made to the basic arrangement of the subject invention. For instance, the angle of incline of the liquid distributor walls 30 can be varied significantly from 0° to about 30° or more from vertical. In one embodiment, the angle of the liquid distributor sidewall 30 is substantially vertical to about 8° from vertical. Another inclined surface is that of the vertical walls of the demister rows 24. In one embodiment, the angle is about 8° from vertical and the angle may vary between about 0° to about 30° or more from vertical. In some embodiments, the upper portion of the demister is closer to the imaginary vertical central plane of the module than is the lower portion of the demister.

Another variation is that the subject modules 20 may be used in conjunction with distillation trays and packings either above or below or interspersed with sections of column using the subject apparatus. The modules of the subject invention may also be used in divided wall distillation columns. A further variation relates to the shape of the surrounding vessel or column. Although most fractionation columns are cylindrical, this is not dictated by this apparatus and it can function equally well in a column having a different cross sectional geometry such as rectangular or square. It is envisioned that a fractionation column would contain from about 10 to about 250 or more contacting stages 12. The design of the modules 20 may be essentially uniform throughout the column in many installations; however, it may vary in one column for example to accommodate changes in fluid flow rates in different parts of the column.

The figures do not illustrate all of the options and/or additions to the basic apparatus. The number of such additions is lengthy since it includes additional supports, fasteners, braces, etc. of a general mechanical nature which can be varied almost endlessly.

The contacting modules 20 may be symmetrical relative to an imaginary central vertical plane that bisects the module along its length as can be seen by the cross sectional view of the module in FIG. 2 which module comprises a liquid distributor 20 between a pair of demisters. Another embodiment in which the contacting module further comprises the receiving pans and associated ducts on either side of the demisters may also be symmetrical.

Figure 10A:
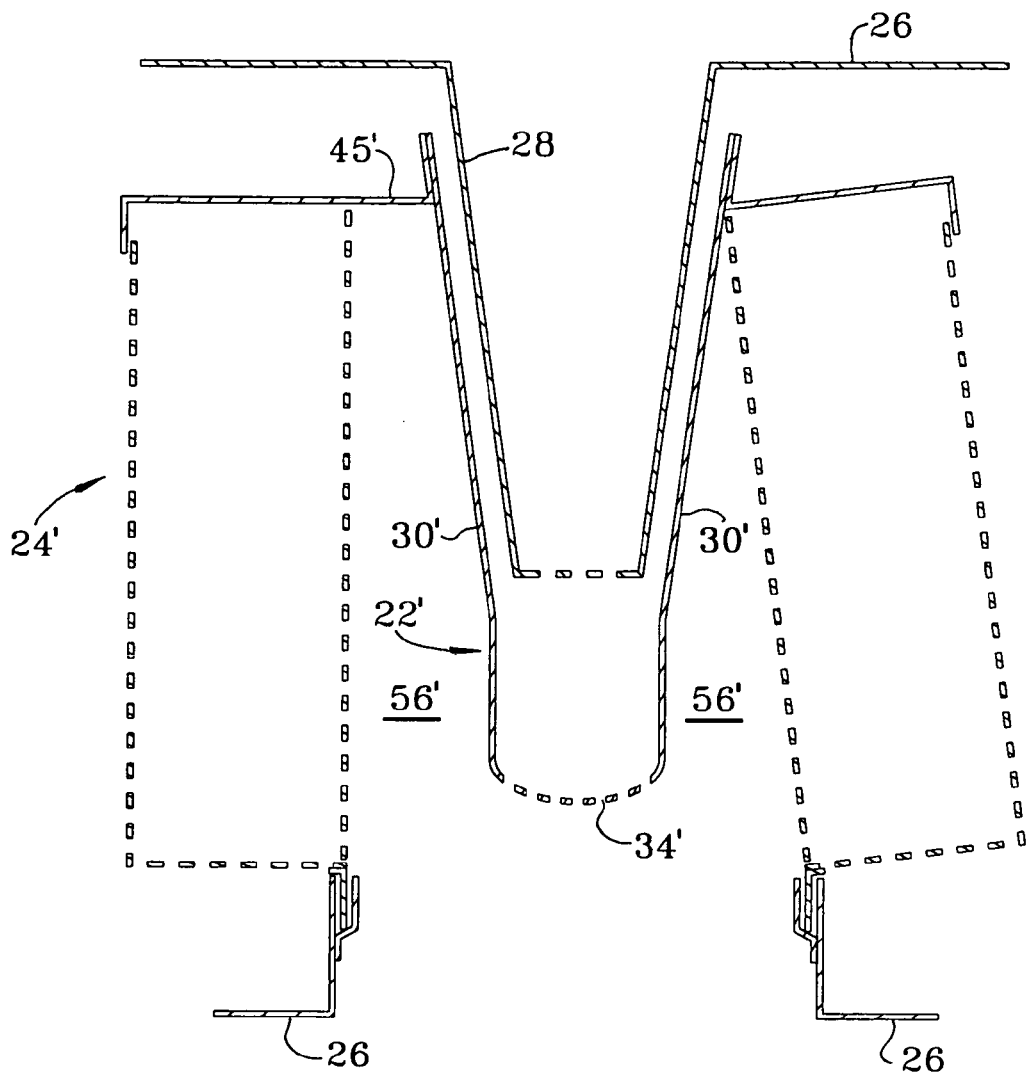
FIGS. 10A-10B depict alternate embodiments of contacting modules of the invention.
Figure 10B:
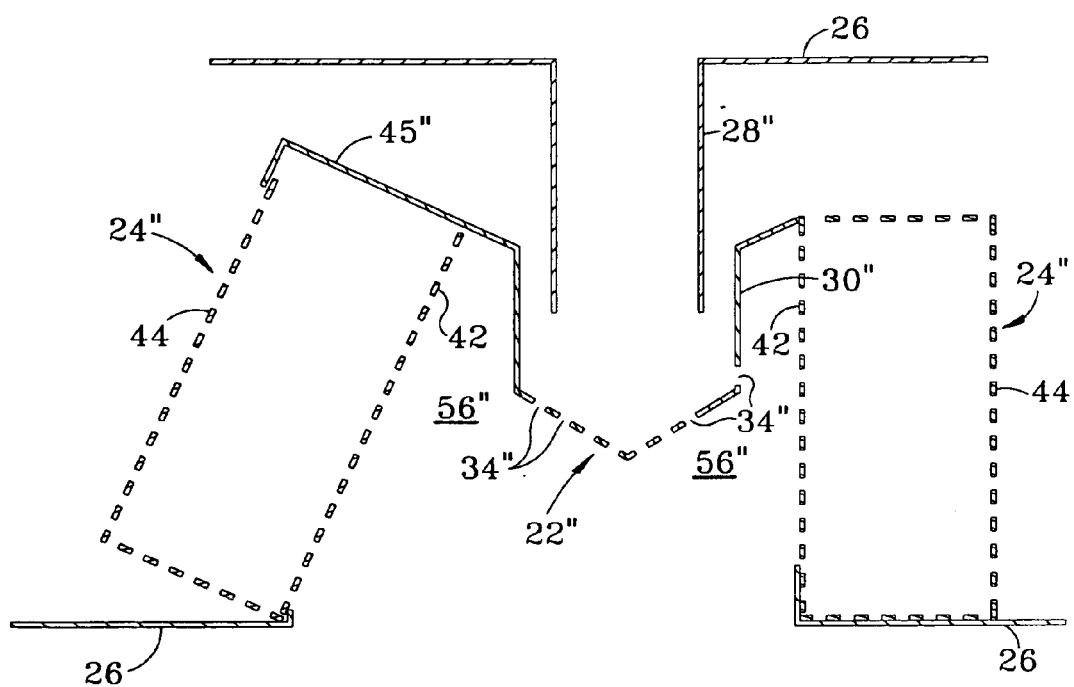

FIGS. 10A and 10B are presented to emphasize that the modules need not be symmetrical and to illustrate several additional non-limiting embodiments of the invention. For example, FIG. 10A shows that the liquid distributor 22' need not extend throughout its length to the level of receiving pan 26 of the stage. The end portions of the liquid distributor may be configured to provide support by extending to the support ring attached to the vessel wall, or other support mechanism mentioned herein and those which are well known in the art may be used. Liquid distributor 22' also shows that the walls 30' and the lower or bottom portion of the liquid distributor may be variously configured such as outlets 34' which direct the liquid to a greater degree downward than laterally. Variations in the demisters are also illustrated by the left demister 24' which is positioned vertically and spaced apart from the upper portion of the liquid distributor. Top imperforate plate 45' is configured to extend across the gap between liquid distributor 22' and demister 24' to substantially seal the upper portion of the contacting volume 56' to ensure that the vapor and liquid being co-currently contacted are then separated by flowing through the demisters of the stage. In another embodiment not illustrated, the vertical demister 24' joins the liquid distributor at an upper portion of the wall 30'. The wall 30' is configured to define the contacting volume 56' in cooperation with the vertical demister 24'. FIG. 10B shows that the top of the liquid distributor 22" may be below the top of the demisters 24" and that the duct 28" and/or liquid distributor walls 30" or portions thereof may be substantially vertical. As shown, the outlets 34" are not required to be symmetrically arranged. Demisters 24" may be located on the flat base of the receiving pans in either a vertical or angled configuration. The lower inner surface of the demister may be sealed such as by a solid plate or an extension of the receiving pan to prevent liquid separated in the demister from flowing back into the contacting volume 56". Again, solid top plate 45" may be configured to extend to the liquid distributor if necessary to substantially seal the upper portion of the contacting volume 56". Even if a solid top plate is not used as shown for the demister on the right side of the module depicted in FIG. 10B, a means to seal the upper portion of the contacting volume is provided to prevent by-passing of the demisters. Thus, it can be seen that the demisters can be in substantially parallel alignment even if they are not configured identically.

While the contacting modules 20 can be quite short, it is anticipated that they will be greater in length than in width, with the width being measured as the maximum distance between the perforated outlet plates 44 of the opposing demister rows 24. The length of the modules 20 is dictated by the internal dimension of the column or vessel which it spans. The modules 20 may be fabricated to be self supporting or they may be supported through structural members extending across the internal volume of the column. As with the demister units 40, a liquid distributor in a single module 20 may extend across the column or the liquid distributor may be fabricated as two or more individual sections which join together, end to end or by overlapping sections, to extend across the column. Likewise, the contacting modules 20 may be fabricated as sectional units which include each element of the module and are connected end to end as they are installed to form the contacting module rows. In another embodiment, the modules 20 may be fabricated as units which are half modules that are joined lengthwise for example during installation. This can be readily envisioned if one were to split the module shown in FIG. 2 along the imaginary central vertical plane that bisects the module along its length. Such a half module could serve as a complete module if the liquid distributor and receiving pan were complete in accord with the teachings herein. Thus, in one embodiment a module may comprise a liquid distributor, a demister, and a receiving pan having at least one duct. In many applications each stage will include a plurality of contacting modules; however, in some embodiments a single module on a stage may be sufficient to accomplish the vapor-liquid contacting desired.

The figures are only representations of actual apparatus and are not to scale. The size of various components of the apparatus will be set by the expected maximum fluid flow rates which the apparatus must accommodate. To provide a guideline for the design of the apparatus it is noted that the inlet 32 of the liquid distributor 22 will typically have a width of about 8 cm to about 25 cm. In other embodiments the width with range from about 10 cm to about 20 cm. The vertical distance between equivalent points on two layers of the apparatus is within the range of about 25 cm to about 75 cm. In other embodiments the vertical distance ranges from about 30 cm to about 45 cm. The demister units 40 are about 7 cm to about 20 cm wide measured between the vertical inlet and outlet surfaces 42 and 44. The bottom of the demister unit 40 is about 2.5 cm to about 10 cm above the receiving pan 26 so that a gap is formed between the bottom of the demister unit 40 and the receiving pan 26 to facilitate liquid drainage from the demister unit 40 to the receiving pan 26 and for liquid flow from the receiving pan 26 to the ducts 28. In other embodiments the demister unit 40 rests on the flat base 50 of the receiving pan. In other embodiments the bottom of the demister is up to about 15 cm above the receiving pan 26.

According to a particular embodiment, in lieu of the perforated inlet plates 42, a porous blanket layer such as mesh pad covers the inlet to the demister units 40. The use of this porous blanket has been found to improve vapor-liquid separation especially during operation at higher vapor rates. The porous blanket can be of conventional mesh material used for liquid droplet de-entrainment or so called "mist eliminators." It will typically comprise very loosely woven strands forming a high surface area low pressure drop blanket. The mesh blanket is for fine droplet coalescence and liquid distribution to the separator. An alternative construction is to mount the mesh in an indentation in the separation structure 41 or totally inside the demister unit 40. Other materials such as perforated plates may be placed within the contacting volume 56 to improve vapor-liquid contacting and mass transfer.

The materials of construction of the subject apparatus can be those which are customarily used for vapor-liquid contacting apparatus. Materials of construction that are compatible with the vapor and liquid compositions, the operating conditions of the vapor-liquid contacting process, and the other materials of construction used in the process can be considered for the present invention. Common materials include metal of standard thickness, ranging from about 7 gauge to about 30 gauge. The thickness of the metal required will vary in part depending on the strength of the metal and its composition. The metal may range from carbon steel to stainless steel in more corrosive situations, or other metals including titanium. The apparatus can also be fabricated from composites and polymeric materials including reinforced plastics. The apparatus may be fabricated of a single material such as a standard gauge metal, or, alternatively, the apparatus is fabricated from a combination of materials.

A further variation which is possible with the subject apparatus is the placement of catalyst at various points within the apparatus such as within the liquid distributor 22 or at other locations in the void volumes used to transport vapor or liquid in order to perform catalytic distillation. The best placement of the catalyst will be determined in part by whether the desired reaction occurs in the liquid or vapor phase.

Operating conditions for a fractionation column are confined by the physical properties of the compounds being separated in the column. Operating temperature and pressure of a column may be varied within these confines to minimize the operating cost of the column and accommodate other commercial objectives. The operating temperature may range from very low temperatures used in cryogenic separations to temperatures which challenge the thermal stability of the compounds. Conditions suitable for the subject process therefore include a temperature in the broad range of from about −50° C. to about 400° C. The column is operated at a pressure sufficient to maintain at least a portion of the feed compounds present as a liquid.

The invention claimed is:

1. An apparatus for performing co-current vapor-liquid contacting, comprising:
   a plurality of stages having at least one contacting module, said contacting module comprising;
   a) a liquid distributor having an outlet proximate to a contacting volume;
   b) a receiving pan oriented substantially parallel to said liquid distributor;
   c) at least one duct having an upper end in fluid communication with the receiving pan, and a lower end, wherein the lower end of each duct is in fluid communication with a separate inferior liquid distributor;
   d) a demister having an inlet surface proximate to the contacting volume and an outlet surface superior to said receiving pan; and
   wherein the contacting module of at least one of said stages is rotated with respect to the contacting module of another one of said stages.

2. The apparatus of claim 1 wherein the liquid distributor, receiving pan, and demister of the module each extend substantially along the length of the module.

3. An apparatus for performing co-current vapor-liquid contacting, comprising:
   a plurality of stages, having at least one contacting module and a plurality of receiving pans, said contacting module comprising;
   a) a pair of substantially parallel demisters being spaced apart;
   b) a liquid distributor located between the pair of demisters and cooperating with the demisters to define a contacting volume, the liquid distributor having an outlet in fluid communication with the contacting volume; and
   c) each demister having an inlet surface in fluid communication with said contacting volume and an outlet surface superior to separate said receiving pans of said stage;
   wherein at least a portion of said contacting module is located between a pair of said receiving pans, each receiving pan having at least one duct, each duct of one receiving pan providing fluid communication to a separate inferior liquid distributor; and the contacting module of at least one of said stages being in non-parallel alignment with respect to the contacting module of another one of said stages.

4. The apparatus of claim 3, wherein each of said ducts extend into the associated inferior liquid distributor.

5. The apparatus of claim 3, wherein each duct comprises an enlarged mouth and wherein a vapor passage is formed between each of the ducts and the associated inferior liquid distributor.

6. The apparatus of claim 3, wherein at least one of said receiving pans is shared by two modules.

7. The apparatus of claim 3, wherein said demisters are supported by the receiving pans.

8. The apparatus of claim 7, wherein said demisters are further supported by said liquid distributor.

9. The apparatus of claim 3, further comprising an inlet plate covering a portion of said liquid distributor that is proximate to the bottom of a superior liquid distributor, said inlet plate comprises a plurality of sidewalls that are configured to direct liquid to a volume having an upwardly flowing vapor stream.

10. The apparatus of claim 3, wherein at least one of said receiving pans further comprises a dividing baffle between at least two of the ducts.

11. The apparatus of claim 3, wherein the contacting volume increases in the downward direction of the module.

12. The apparatus of claim 11, wherein the liquid distributors are tapered in the downward direction.

13. The apparatus of claim 11, wherein an upper portion of the demisters is closer to a central vertical plane of the module than a lower portion of the demister.

14. The apparatus of claim 3, wherein a top surface of the demister is sealed.

15. The apparatus of claim 14, wherein an upper portion of the outlet surface is sealed.

16. The apparatus of claim 3, further comprising a substantially vertical baffle that is proximate to the outlet surface of said demister.

17. The apparatus of claim 3, further comprising a substantially enclosed, vertical outer vessel that contains said stages, said vessel including at least one feed inlet and two fluid outlets.

18. The apparatus of claim 17, further comprising at least one collector/distributor.

19. A method for vapor-liquid contacting, comprising the steps of:
   a) passing a vapor stream upwardly into a contacting volume;
   b) directing liquid through an outlet of a first liquid distributor into the contacting volume;
   c) entraining the liquid in the vapor to flow co-currently into a demister;
   d) separating the liquid from the vapor in the demister;
   e) passing the vapor stream exiting the demister to a superior contacting volume;
   f) delivering the liquid exiting the demister to a receiving pan; and
   g) passing the liquid from the receiving pan through at least one duct that directs the liquid into an inferior liquid distributor;

wherein each duct associated with one of said receiving pan delivers liquid into separate inferior liquid distributors, the inferior liquid distributors being in non-parallel alignment with respect to the first liquid distributor.

20. The method of claim 19, wherein each of said ducts extend into the associated inferior liquid distributor, wherein each duct comprises an enlarged mouth, and wherein a vapor passage is formed between each of the ducts and the associated inferior liquid distributor.

* * * * *